US010515358B2

(12) United States Patent
Nagasundaram et al.

(10) Patent No.: US 10,515,358 B2
(45) Date of Patent: Dec. 24, 2019

(54) CONTEXTUAL TRANSACTION TOKEN METHODS AND SYSTEMS

(71) Applicant: VISA INTERNATIONAL SERVICE ASSOCIATION, San Francisco, CA (US)

(72) Inventors: Sekhar Nagasundaram, Austin, TX (US); Ajit Gaddam, Sunnyvale, CA (US); Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 817 days.

(21) Appl. No.: 14/518,983

(22) Filed: Oct. 20, 2014

(65) Prior Publication Data

US 2015/0112870 A1 Apr. 23, 2015

Related U.S. Application Data

(60) Provisional application No. 61/892,927, filed on Oct. 18, 2013.

(51) Int. Cl.
*G06Q 20/38* (2012.01)
*G06Q 20/40* (2012.01)

(52) U.S. Cl.
CPC ....... *G06Q 20/3821* (2013.01); *G06Q 20/385* (2013.01); *G06Q 20/401* (2013.01)

(58) Field of Classification Search
CPC .................................................. G06Q 20/3821
See application file for complete search history.

(56) References Cited

U.S. PATENT DOCUMENTS

| | | |
|---|---|---|
| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |

(Continued)

FOREIGN PATENT DOCUMENTS

| | | |
|---|---|---|
| EP | 2 156 397 A1 | 2/2010 |
| WO | 01/35304 A1 | 5/2001 |

(Continued)

OTHER PUBLICATIONS

Wang, U.S. Appl. No. 62/000,288 (unpublished), Payment System Canonical Address Format filed May 19, 2014.

(Continued)

*Primary Examiner* — Jacob C. Coppola
(74) *Attorney, Agent, or Firm* — Kilpatrick Townsend & Stockton LLP

(57) ABSTRACT

Embodiments of the present invention are directed to methods, systems, apparatuses, and computer-readable mediums for generating and providing a transaction token that may provide contextual information associated with the token. Accordingly, the transaction token may provide any entities within a transaction processing system immediate information about the context in which the token was generated, how the token may be used, and any other information that may be pertinent to processing the token.

22 Claims, 9 Drawing Sheets

(56) References Cited

U.S. PATENT DOCUMENTS

| | | | |
|---|---|---|---|
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 * | 8/2005 | Uzo ................ G06Q 20/06 380/268 |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,533,264 B2 | 5/2009 | Ballinger et al. |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,010,428 B2 * | 8/2011 | Maw ................ G06Q 20/10 705/35 |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B2 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |

(56) References Cited

U.S. PATENT DOCUMENTS

| | | |
|---|---|---|
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 * | 3/2016 | Hammad .............. G06Q 20/12 |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0110983 A1 * | 5/2008 | Ashfield ............... G06Q 20/24 |
| | | 235/382 |
| 2008/0201264 A1 | 8/2008 | Brown |
| 2008/0201265 A1 | 8/2008 | Hewton |
| 2008/0203151 A1 * | 8/2008 | Dixon .................. G06Q 20/40 |
| | | 235/380 |
| 2008/0228646 A1 | 9/2008 | Myers |
| 2008/0243702 A1 * | 10/2008 | Hart .................. G06Q 20/3672 |
| | | 705/66 |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 * | 9/2010 | Moore ................ G06F 21/335 |
| | | 705/75 |
| 2010/0258620 A1 | 10/2010 | Torreyson |
| 2010/0291904 A1 | 11/2010 | Musfeldt |
| 2010/0293382 A1 * | 11/2010 | Hammad ............... G06Q 20/12 |
| | | 726/9 |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |

(56) References Cited

U.S. PATENT DOCUMENTS

| | | |
|---|---|---|
| 2011/0087596 A1 | 4/2011 | Dorsey |
| 2011/0093397 A1 | 4/2011 | Carlson |
| 2011/0099104 A1* | 4/2011 | Nybom .............. G06Q 20/06 705/41 |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0203700 A1* | 8/2012 | Ornce .............. G06Q 20/3278 705/67 |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1* | 10/2013 | Hruska .............. G06Q 20/10 705/67 |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |

(56) References Cited

U.S. PATENT DOCUMENTS

| | | |
|---|---|---|
| 2014/0025958 A1 | 1/2014 | Calman |
| 2014/0032417 A1 | 1/2014 | Mattsson |
| 2014/0032418 A1 | 1/2014 | Weber |
| 2014/0032419 A1* | 1/2014 | Anderson .............. G06Q 20/12 705/78 |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1* | 6/2014 | Aabye .................. G06Q 20/027 705/44 |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0032652 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 01/35304 A9 | 5/2001 |
| WO | 2004/042536 A2 | 5/2004 |
| WO | 2006/113834 A2 | 10/2006 |
| WO | 2008/144555 A1 | 11/2008 |
| WO | 2009/032523 A1 | 3/2009 |
| WO | 2010/078522 A1 | 7/2010 |
| WO | 2012/068078 A1 | 5/2012 |
| WO | 2012/098556 A1 | 7/2012 |
| WO | 2012/142370 A2 | 10/2012 |
| WO | 2012/167941 A1 | 12/2012 |
| WO | 2013/048538 A1 | 4/2013 |
| WO | 2013/056104 A1 | 4/2013 |
| WO | 2013/119914 A1 | 8/2013 |
| WO | 2013/179271 A2 | 12/2013 |

OTHER PUBLICATIONS

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

(56) References Cited

OTHER PUBLICATIONS

Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

\* cited by examiner

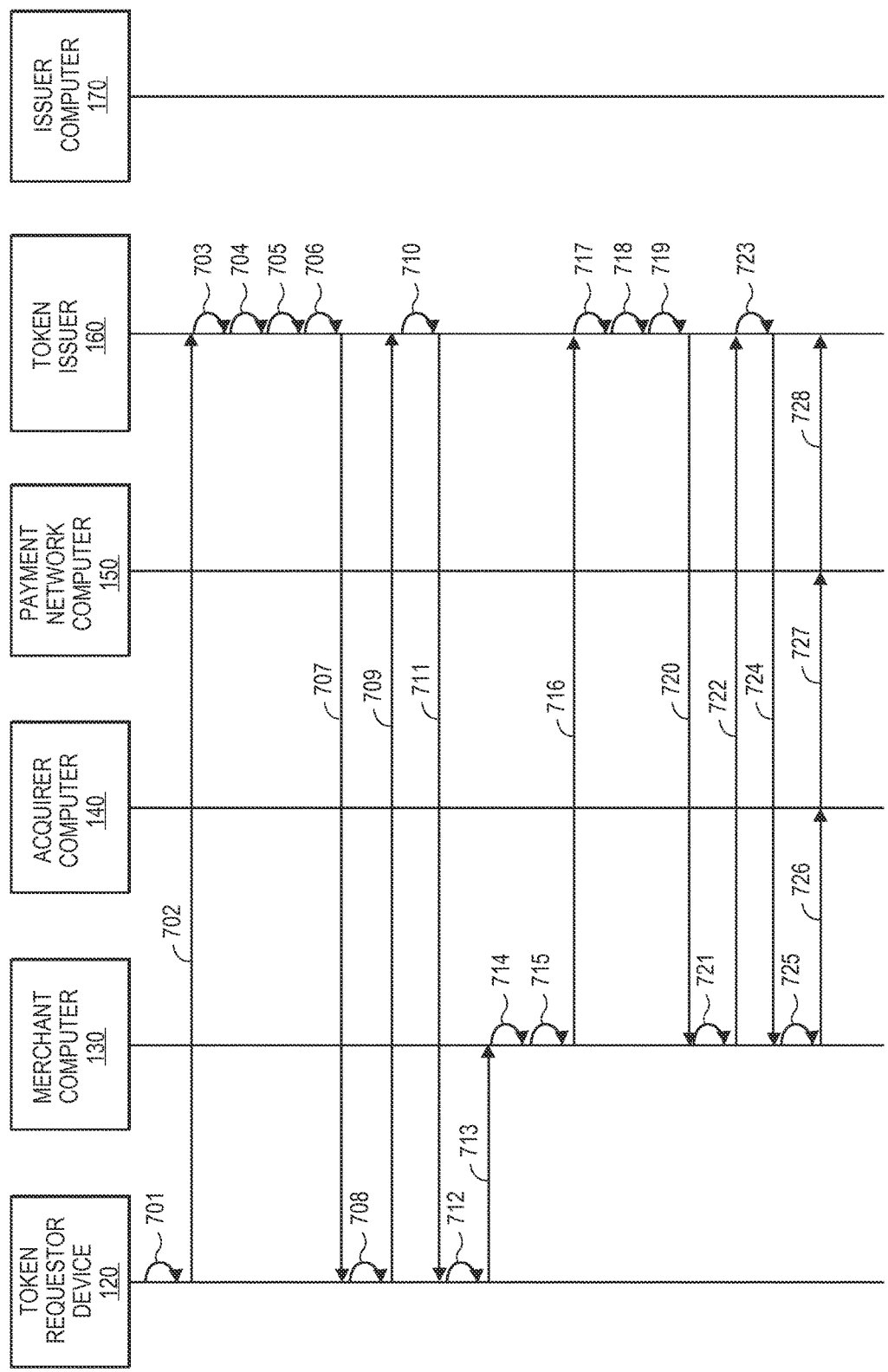

CONTEXTUAL TRANSACTION TOKEN METHODS AND SYSTEMS

CROSS-REFERENCES TO RELATED APPLICATIONS

This application is a non-provisional of and claims the benefit of priority to U.S. Provisional Application No. 61/892,927, filed Oct. 18, 2013, which is hereby incorporated by reference in its entirety for all purposes.

BACKGROUND

Payment tokens are being used to conduct payment transactions. A payment token may be a substitute for an account number. The use of payment tokens instead of account numbers is desirable, since the underlying accounts will not be compromised if the payment tokens are compromised.

While the use of payment tokens is desirable, entities in a transaction system may need information about the payment token for various reasons. For example, entities such as merchants may want to perform fraud or risk analyses on the payment token before initiating a transaction. Yet, it is not possible to run traditional fraud or risk analyses on the payment token since it includes purposefully obfuscated account information. To obtain information about the payment token, one must make appropriate inquiries to remote databases that store the information.

This problem is further exacerbated when account information is exposed to various entities during the transaction life-cycle. This may lead to multiple tokenization layers that are applied to the payment token by each entity that processes the payment token. For example, a digital wallet may tokenize an account number to generate a first payment token and a merchant or acquirer may apply an additional tokenization layer to generate a second payment token from the first payment token. The additional tokenization processing that takes place can further obfuscate the original account number and any information that may relate to the original payment token.

Accordingly, there is a need for a token processing system that may be capable of providing context including any important or relevant information associated with a token to a number of entities within a transaction processing system.

Embodiments of the invention address these and other problems, individually and collectively.

BRIEF SUMMARY

Embodiments of the present invention are directed to methods, systems, apparatuses, and computer-readable mediums for generating, providing, and processing a transaction token that provides contextual information that can be provided to any entity within a transaction processing system. The transaction token may provide any entity within the transaction processing system with immediate information about the transaction token. Such information may include information about how the transaction token was generated, how the transaction token may be used, the history of use or processing of the transaction token, and any other information that may be pertinent to processing and/or validating the status of the transaction token.

Tokenization involves the replacement or exchange of original payment credentials (i.e., a primary account number (PAN)) with a substitute identifier (i.e., a transaction token). The substitute identifier may be used as a replacement for the original payment credentials to initiate a transaction or manage payment activity. A transaction token according to an embodiment of the invention may include any suitable information associated with a consumer's account.

According to embodiments of the present invention, the transaction token may include a predetermined format that can be an account number substitute and can also provide contextual information about the transaction token itself.

In some embodiments, a transaction token according to an embodiment of the invention may include a token format that may include 64 bits of financial institution information (e.g., an issuer identifier, a data type, transmission channel information, token purpose information, etc.) and 64 bits of consumer/product information (e.g., a token verifier, geo-location information, device fingerprinting information, token payload information, etc.). Accordingly, any entity in the transaction flow may understand the context (who issued the token, when it was generated, when it will expire, etc.) surrounding a token at any time. Further, the contextual information may be verified or validated by a token verifier or token issuer at any time to ensure that the transaction token is valid.

One embodiment of the present invention is directed to a method comprising a server computer receiving a request for a transaction token from a requestor. The method further comprises the server computer determining a consumer account and contextual information associated with the request for the transaction token. The method further includes the server computer determining a substitute identifier for the consumer account and generating the transaction token associated with the request. The transaction token may include the determined contextual information and the substitute identifier. The method further includes the server computer storing the transaction token in a transaction token database and sending the transaction token to the requestor.

Another embodiment of the invention is directed to a computer comprising a processor and computer-readable medium coupled to the processor, where the computer-readable medium comprises code, executable by the processor, for performing a method. The method comprises receiving a request for a transaction token from a requestor, determining a consumer account associated with the requestor and contextual information associated with the request for the transaction token, and generating the transaction token. The transaction token includes the determined contextual information and a token payload. The method further comprises storing the token payload and the determined contextual information in a token database, where the token payload is associated with the consumer account, and sending the transaction token to the requestor.

Another embodiment is directed to apparatuses, systems, and computer readable media configured to perform the methods described above.

These and other embodiments of the invention are described in further detail below.

BRIEF DESCRIPTION OF THE DRAWINGS

FIGS. 7A and 7B show an exemplary flow diagram for a method of processing a transaction using a transaction token according to an embodiment of the invention.

DETAILED DESCRIPTION

Embodiments of the present invention are directed to methods, systems, apparatuses, and computer readable media for generating, providing, verifying, and processing transaction tokens. The transaction tokens may include contextual information about the transaction tokens themselves. This contextual information may be provided to a variety of entities within a transaction processing system. Using the contextual information, the entities can obtain information about the token. Contextual information about a transaction token may include its origin, restrictions on the use of the transaction token, permissible uses of the transaction token, and information regarding the validity of the transaction token. Using embodiments of the invention, an entity such as an issuer can quickly and easily obtain information about transaction tokens without the need to request this information from a third party or a central token vault.

In some embodiments, the transaction token may be a payment token. The payment token may be implemented by using a specific token format. Information may be embedded within the transaction token or within a request or response message associated with the transaction token. In some embodiments, the payment token may include 128 bits or 16 octets and may comprise information regarding the transaction token issuer as well as consumer or product information associated with the transaction token. In some embodiments, the first 64 bits of the payment token format can identify the transaction token issuer (or other financial institution) and the second 64 bits can be used to represent customer and/or product information.

Figure 2:
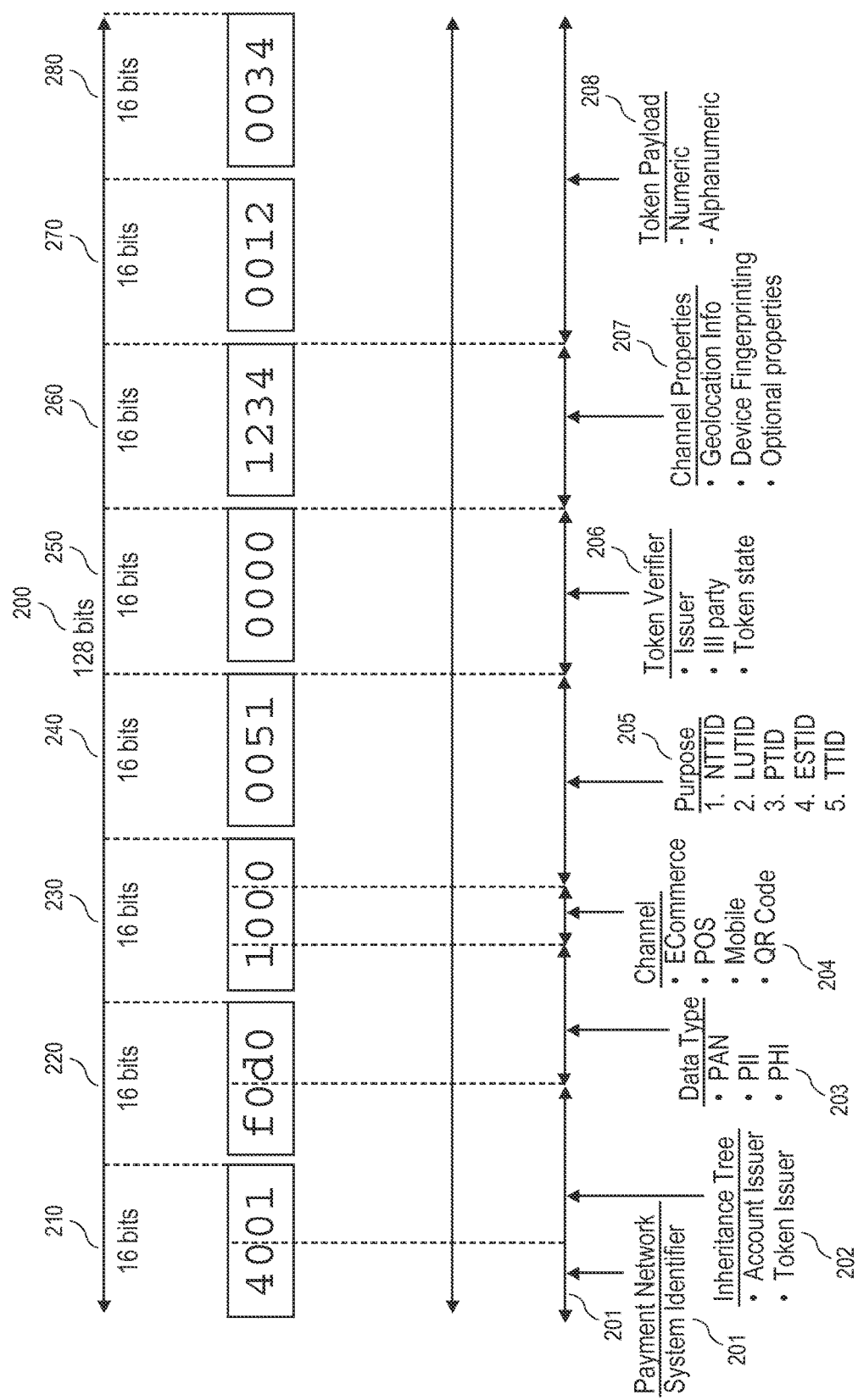
FIG. 2 shows an exemplary transaction token format according to an embodiment of the invention.

Referring to FIG. 2, an exemplary transaction token may be "4001:f0d0:1000:0051:0000:1234:0012:0034." Using the example above, the first 64 bits (e.g., "4001:f0d0:1000:0051") may identify the token issuer information and/or financial institution information. The second 64 bits (e.g., "0000:1234:0012:0034") may identify consumer and/or product information. The second 64 bits may also comprise a token payload or a value of an account substitute. This data format is an example and the transaction token may comprise any amount of information suitable for a transaction token processing system and the information may be formatted in any suitable manner.

The transaction token may include any suitable type of information or format. For example, the transaction token may include a format that may comprise data elements including a system identifier, an account issuer identifier, a data type identifier, a channel identifier, a token purpose identifier, a token verifier identifier, information about the channel properties associated with the transaction token, and a token payload or account substitute.

In embodiments of the invention, the transaction token format may provide any suitable information about the transaction token to any suitable entity. The information that is embedded in the transaction token may include information about suitable entities that are configured to process the transaction token (e.g., which payment processing network is associated with the transaction token or underlying account credentials), the token issuer that generated the transaction token, that one or more channels in which the transaction token can be used (e.g., point-of-sale transactions, e-commerce transactions, etc.), the purpose of the transaction token (e.g., payment transaction, personal health information identifier, rewards or loyalty account, etc.), the token verifier associated with the transaction token (e.g., a verification server configured to verify the token), information about the channel properties associated with the transaction token (e.g., a geo-location limitation, token expiration date, transaction limitations, etc.), and any other suitable contextual information about the transaction token.

Embodiments of the present invention may provide a number of advantages. For example, the transaction tokens according to embodiments of the invention can inherently provide contextual information about the transaction tokens themselves. The contextual information may be used by any entity in the transaction processing system to assist in processing and validating tokens received during any type of transaction without requiring communication with a central token database or other third party token vault. Accordingly, fewer system resources are required to process, verify, manage, and identify transaction tokens when using embodiments of the invention. Traditional transaction tokens do not embed contextual information as in embodiments of the invention, and are "dummy" substitute values for payment credentials.

Additionally, using embodiments of the invention, new tokens may be derived using a token addressing or token formatting scheme to facilitate further token management and value added functionality. Embodiments of the invention can also provide additional information to entities within the transaction system. For example, a merchant may update a transaction token to include value-added information that may be used by other entities in the transaction processing system. For instance, a transaction token may have an optional data field which a merchant may use to include a coupon or loyalty account identifier. Thus, a payment processor or other entity may use the optional or additional data to provide an associated discount or cross-platform service for the transaction.

Furthermore, in some embodiments, entities may use the token formatting and addressing to derive secondary tokens from the transaction tokens for account management, value added services (e.g., reward programs, coupons, etc.), fraud management or fraud detection, or any other suitable purpose and use the derived tokens to easily track and provide value-added services associated with transaction tokens. For example, a merchant may use the coupon or loyalty account identifier described above in an internal derived transaction token to associate coupon information stored in a value-added database with a transaction token. The derived transaction token may be used internally to identify that the coupon and the transaction token are associated but may not be transmitted to external parties. Accordingly, the token format may be updated with the expanded value-added information to allow the merchant to quickly and easily associate two (or more) pieces of information, databases, etc.

Accordingly, in some embodiments, a public transaction token may be translated within a merchant system (or other system) to hide the contents of the transaction token within the merchant or corporate network. Additional functionality and management functionality may be applied to the transaction token format by a merchant to generate proprietary or merchant-specific token attributes. Accordingly, the transaction token can include merchant specific token data that may be used for the merchant's own internal purposes. As such, some embodiments of the transaction token may provide solutions for enterprise information integration (EII).

As an illustration, a merchant may receive a transaction token during a transaction where the transaction token includes information about the specific purpose of the transaction token. For example, the information in the transaction token may indicate that the transaction token is a high value token (e.g., one that is used for payment) or a low value token (e.g., one that is not used for payment). A merchant can thus determine if the transaction token is a high value token or a low value token. The merchant may also include additional merchant-specific information in the token and may reformat the transaction token if desired. As such, in some embodiments, the transaction token format may provide enough space so that a merchant may modify or customize a transaction token for their own purposes. For example, the merchant could modify the transaction token or token format to identify, process, and/or manage consumer accounts and/or value added programs.

Furthermore, in some embodiments, a transaction token format may include an inheritance tree that allows an entity within the transaction processing system to determine the other actors, functions, and processes that have been applied to the transaction token. For example, a payment processor may receive a transaction token that was generated using a transaction token format that includes information regarding who issued the token, what device the consumer used to request, store, and/or provide the token for a transaction, what merchant received the token, what transaction channel was used for the transaction, who is responsible for verifying the token, and any other suitable information associated with the transaction token. Accordingly, the transaction token format may maintains context and identity persistence from the start of a transaction process (i.e., token issuance) to the end (i.e., payment authorization and settlement). Thus, an inheritance tree may be updated as a token passes through various entities in a transaction processing system and any actions are performed on the transaction token or for the transaction.

Furthermore, the transaction token format may also include limits on the transaction token including who can use the token, what channel it can be used over, etc. Accordingly, if the transaction token is being utilized outside of these limits, the transaction may be denied and/or the transaction token may be de-authorized or revoked so that the transaction token may not be used in the future. In some embodiments, the de-authorization could include inputting a data value into the transaction token format that informs downstream entities that the token has been de-authorized or is invalid. Alternatively, a message could be sent to the token issuer or token verifier to de-authorize the transaction token or to include the transaction token on a blacklist or revocation list.

Further, in some embodiments, a transaction token may be configured to be processed through existing payment processing networks. For example, a transaction token may have the format of a primary account identifier (e.g., PAN) or other traditional payment account identifier and a merchant may initiate a transaction using the transaction token in an authorization request message as if it were a typical PAN. If the merchant translates the transaction token internally, the merchant may either submit the original transaction token with an indicator of the public transaction token format or may submit a transaction token with an updated transaction token format to downstream entities, depending on the configuration of the system. Either way, indicators may be included in the transaction token that may indicate to other entities that the authorization request message includes a transaction token and that the transaction may be processed as such. Accordingly, typical transaction processing may continue with the transaction token and the transaction token may be forwarded to an acquirer or merchant processor associated with the merchant. Ultimately, the authorization request message including the transaction token may be sent to a payment processing network and issuers may be able to determine the contextual information including, for example, the path, decisions, and alterations associated with the transaction token during processing.

Using embodiments of the invention, less backend processing is required as less information regarding a particular transaction token needs to be stored at a token issuer's central database. Instead, the information about the limitations, uses, and rules regarding a token may be provided within the transaction token itself and less communication is necessary to determine information about the token. Further, a system may also enforce a fraud rule-set by using information within the transaction token to implement fraud rules. Accordingly, embodiments provide more information to entities relying on or processing tokens that may be used without requiring contact or additional resources used to communicate with a central token issuer, verifier, or other entity.

In some embodiments, the transaction token format may include a token legend indicator or token format mapping indicator that allows an entity to determine the appropriate formatting rules for interpreting a transaction token. Accordingly, a merchant may receive the transaction token, and may determine the appropriate token legend or mapping associated with the token issuer or account issuer. A token legend or other token format information associated with a token issuer, token generator, token verifier, merchant, payment processor, mobile wallet (or other token requestor), or any other entity in the transaction token processing system may be distributed to entities within the transaction system so that the transaction tokens may be interpreted and the contextual information within the transaction tokens may be understood by entities within the system. Accordingly, some systems may be have multiple different types of tokens legends associated with various entities within the transaction processing system. A token legend may be used to interpret the transaction token and may be identified and managed by a central payment processor, standards organization, token issuer, token verifier, or any other entity that collects, organizes, and/or manages transaction token legends or formats.

Furthermore, the transaction token format provides for transaction tokens that are extensible and flexible. Therefore, entities within the transaction processing system have much more flexibility regarding the number of tokens that may be generated, the type of data the transaction tokens may contain, and the rule sets for processing transactions incorporating transaction tokens.

Additionally, using embodiments of the present invention, a system may have a much larger number of tokens that are possible than typical tokenization systems. Accordingly, a system may effectively never run out of tokens as the token format may be extended whenever the transaction tokens are nearing their current limit based on the previous transaction token format.

Furthermore, tokens of numerous types may comingle with other tokens representing various datasets and the transaction tokes may be used to manage, provide, and process many different types of tokens (e.g., financial, personal health information (PHI), personally identifiable information (PII), etc.) and/or transactions. For example, the data type field of the transaction token may inform an entity as to the purpose of the transaction token. For instance, whether a transaction token is associated with or represents a payment account (e.g., a PAN), PII (personal identity information), PHI (personal health information), etc. As such, if an entity receives a transaction token that is associated with a financial account (e.g., PAN type) the entity may process the received transaction token as being associated with a transaction while if the entity receives a transaction token associated with personal or sensitive information that is not associated with a financial account, the entity may perform different steps (e.g., register a user in a system, exchange stored sensitive information with the received PII token, etc.). For instance, a transaction token may include a social security number, driver's license number, passport number, know your customer (KYC) information, etc., and may be identified as a non-transactable transaction token and/or as including a PII data type of information. Accordingly, an entity may perform different actions on the different types of tokens depending on the system configuration and processes associated with the different types of data. Although the description below focuses on payment transactions, embodiments are not limited to such applications and the concepts may be applied to multiple different types of transactions, different types of sensitive information, etc., as one of ordinary skill would recognize.

Prior to discussing embodiments of the invention, description of some terms may be helpful in understanding embodiments of the invention.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a PAN) may be tokenized by replacing the primary account identifier with a substitute number (e.g., a token) that may be associated with the payment account identifier.

"Token exchange" or "de-tokenization" is a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "substitute identifier" may include any series of characters, numbers, graphics, symbols, or other information that may take the place of information. Typically, a substitute identifier is utilized so that sensitive account information may be hidden and thus increase the security of a transaction. For instance, a PAN, personally identifiable information (PII), or personal health information (PHI) may all be examples of information that identify an account or other sensitive information, but may be replaced with a substitute identifier in order to prevent fraud.

"Contextual information" may refer to any data or information surrounding or related to an underlying subject. For example, contextual information for a token may include any data associated with the token that may be utilized by entities involved in the transaction process. For instance, the contextual information may include information useful for processing, verifying, and utilizing a token when it is received. For example, the information may identify entities such as a token issuer, token verifier, token requestor, or any other entity that may have processed the token. This can be useful to inform a downstream entity about the history surrounding the token from its generation to current state, including identification of any entities that may have handled the token as well as entity-specific information that the entities may have provided.

Further, the contextual information may include the purpose for the token, which can help easily identify characteristics of the token. For example, the token may indicate it is meant for limited use in a mobile device or a specific payment network ecosystem. Additionally, the contextual identification may identify the specific channels over which the token is meant to processed, an amount or date range over which a token should be used, and current authentication status. The contextual information can indicate to an entity whether the token is being utilized in an appropriate environment and under the suitable limitations associated with the token. The contextual information may be utilized to verify the validity of a token and prevent further processing of the token if there is any indication of fraud or misuse. Accordingly, the contextual information can help an entity handling the token to decide how it may process the token.

A "transaction token" may be a token that is used for or in a transaction. For example, a transaction token may include a token that is an account number substitute and provides contextual information about a transaction. Additionally, in some embodiments, a transaction token is not limited to a single or a particular transaction and may be used for more than a single transaction. Further, the transaction token may be associated with a particular transaction token format that may be used to understand the contextual information within a transaction token. In some embodiments, a token legend may be provided to an entity to allow that entity to understand the transaction token format of a transaction token.

"Transaction entity information" may refer to any data or information surrounding or related to any participants partaking in or associated with a transaction. For example, transaction entity information may identify or provide background about certain entities involved with a financial transaction associated with a transaction token. For instance, transaction entity information may include at least one of a token issuer identifier, an account issuer identifier, a token requestor identifier, a merchant identifier, and a token verifier identifier. An issuer identifier, such as a token issuer identifier or an account issuer identifier, may identify any entity that manages the account associated with the token or the relationship between the token and the account. A token requestor identifier may identify any entity that generates and sends a request for a token. A token verifier identifier may identify the entity that is configured to verify the transaction token.

"Transaction parameter information" may refer to any data or information surrounding or related to a transaction. For example, transaction parameter information may include contextual information that may identify or provide properties of a transaction token involved in a financial transaction. For instance, transaction parameter information may include at least one of a token type identifier, a channel identifier, channel properties, expiration information, and transaction restriction information. A token type identifier may indicate what kind of sensitive information is associated with the token, such as a financial account identifier (e.g., PAN), personally identifiable information, or personal health information. A channel identifier may indicate what transaction channels the token is meant to be processed over or the channel that the token has been processed over, or both. Channel properties may represent any information associated with the payment channel that may be relevant to an entity.

Transaction parameter information may also include limited-use information of the token, such as expiration information and transaction restriction information. For example, a token may indicate that it is only valid during a certain time period and location. It is helpful for downstream entities to be able to acquire transaction parameter information from the transaction token because it provides a way to validate the token across multiple parameters. For instance, a transaction token may indicate that it is meant for point-of-sale transactions during a certain time period and given geolocation. If an entity processing the token can verify that the above transaction parameter information is valid, then the transaction can be continued. However, if the token cannot be validated since it is being used in an e-commerce transaction instead of in a point-of-sale transaction or after the token should have expired, then the entity may decline the transaction. Accordingly, entities may ensure whether a token is being utilized in the appropriate environment before the transaction is complete or even before a transaction is further initiated and processed through the transaction processing system.

"Merchant specific information" may refer to any data or information surrounding or related to a merchant or merchant system. For example, merchant specific information may include value added information (e.g., loyalty account information, coupon information, etc.), marketing information, or any other information that may be useful to a merchant. The merchant specific information may be shared with other entities (e.g., cross platform loyalty program) or may be limited to the internal merchant system (e.g., internal consumer tracking information used only by the merchant).

"Interpreting" may include inferring or determining the meaning of information. For example, interpreting may include retrieving information from a transaction token, and construing characteristics about the transaction token based on the retrieved information. The information stored in the transaction token format may include identifiers that are associated with various types of information about the token. Accordingly, each identifier may map to token statuses, qualities, or any other attributes that provide contextual information surrounding the token. In some embodiments, databases containing predefined information about the token may be accessed in order to help interpret the information stored in the transaction token. For example, a token legend or other token format mapping guides may be stored and used to interpret the format of a transaction token as well as the underlying information within a transaction token. For instance, a merchant may receive a transaction token and may determine a token legend associated with the transaction, the transaction token, a token legend identifier, or any other information associated with the transaction token. The token legend may inform the merchant as to the format of the transaction token (e.g., $1^{st}$ digit associated with a payment network, $2^{nd}$ digit associated with a token issuer, $3^{rd}$ digit associated with a token verifier, etc.) as well as the meaning of the information within the transaction token (e.g., a token verifier identifier of 4 means the token verifier is token verifier "A", etc.).

"Verifying" may include utilizing information to determine whether an underlying subject is valid under a given set of circumstances. For example, a transaction token may be verified to be valid based on the interpreted contextual information associated with the transaction token. For instance, a transaction token may be validated against the transaction information associated with the transaction token to ensure the transaction token is appropriate for the transaction. Alternatively or additionally, the transaction token may be verified as being valid by sending the transaction token to a token verifier to ensure the token is in good status and/or has not been altered by an unauthorized party. Accordingly, verifying may include any comparison of information to ensure some data or information is correct, valid, accurate, legitimate, and/or in good standing.

A "derived token" may include any token or other substitute identifier that is altered from its original state by an entity. For example, a derived token may refer to a transaction token that is processed by a merchant computer and is generated by updating the determined contextual information with merchant-specific information. Typically, a derived token may maintain the original transaction information to easily identify the original transaction token. A derived token may be utilized for account management, providing value added services, performing fraud analyses, and any other purposes a merchant may need to store and analyze transaction information. In an embodiment, after first receiving the transaction token, the merchant may determine features of the token by interpreting the identifiers provided in the token's contextual information. The merchant may then translate certain information in the transaction token based on the interpreted contextual information and update relevant portions of the transaction token format. The derived transaction token may identify updated token information as desired by the merchant. Accordingly, the merchant could design a translation system to identify, process, and manage consumer accounts, value added programs, and token systems using the transaction token format by incorporating this information into derived tokens.

Additionally, some derived tokens may maintain the same transaction token format and may be updated with optional data, processing information, or other information that may be used by other entities within the transaction processing system to process a transaction. For example, a token verifier may update a transaction token to indicate the transaction token has been revoked when the transaction cannot be verified or otherwise validated. As another example, a merchant may update a transaction token to include a coupon identifier in an optional field or to include a merchant identifier in the inheritance tree data fields to notify other entities as to the merchant associated with the transaction token.

A "predefined token legend" may refer to any information that may be used to interpret information included in a token. For example, the predefined token legend may provide a mapping of token data fields to contextual information associated with the token. In some embodiments, each token issuer (or any other entity within the transaction system) may have a different predefined token legend associated with the contextual transaction tokens. For instance, an entity may communicate information identifying a particular predefined token legend that contains mappings of transaction token data fields to their interpreted values. Thus, a merchant or other entity may identify the token legend associated with a contextual transaction token and may use the predefined token legend to map the information in the transaction token to interpret the contextual information stored therein. For example, if a transaction token comprised an identifier "00" in the $9^{th}$ and $10^{th}$ digits of the transaction token, the token legend may indicate that the $9^{th}$ and $10^{th}$ digits are associated with the data type field of the transaction token and that the identifier "00" is associated with the token data type of PAN. The predefined token legend may be managed by any entity in the transaction processing and may be distributed to entities within the transaction processing system after the token legend is updated by any entity.

A "format identifier" may refer to any information associating an underlying subject to data stored in a system. For example, a format identifier may be information included in the transaction token associated with a predefined token legend that may be utilized to interpret contextual information. For instance, a format identifier may indicate or identify a token legend to be used in interpreting a transaction token. In some embodiments, other information within a transaction token or associated with a transaction may be used as a format identifier. For example, a token issuer identifier, a token verifier identifier, a payment system or processor identifier, or any other suitable information may be used to indicate a token legend in which to use for interpreting the transaction token.

A "token requestor" may refer to an entity or device that requests a token. For example, a token requestor may initiate a token generation process by sending a request that a primary account number (PAN) be tokenized to a token service provider or token issuer. The token requestor may include any application, device, or system that is configured to request a token and/or initiate a transaction with a token. For example, a token requestor can request registration with a token issuer and/or verifier, request token generation, token activation, token de-activation, token exchange, other token lifecycle management related processes, and/or any other token related processes. A requestor may interface with a network token system through any suitable communication networks and/or protocols (e.g., using HTTPS, SOAP and/or an XML interface among others). Some non-limiting examples of token requestors may include, for example, merchants, acquirers, acquirer processors, and payment gateways acting on behalf of merchants, payment enablers (e.g., original equipment manufacturers, mobile network operators, etc.), digital wallet providers, issuers, third party wallet providers, and/or payment processing networks. In some embodiments, a token requestor can request tokens for multiple domains and/or channels. A token requestor may be registered and identified uniquely by a token issuer and/or verifier within the tokenization ecosystem.

A "token subscriber" may refer to any entity that requests verification of a token. The token subscriber may initiate a request that a token be verified by submitting a token verification request message to the token service provider. Some non-limiting examples of token subscribers include a merchant, a token requestor, a consumer, an acquirer, a payment network, an issuer, and/or any other entity within a transaction processing system.

A "token issuer" may refer to an entity operating one or more server computers in a token service system that generates, processes and maintains tokens. The token issuer may include or be in communication with a token vault where the generated tokens are stored. Specifically, the token vault may maintain a mapping between a token and a primary account number (PAN) represented by a token.

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token, an expiration date, a token presentment mode, a token requestor identifier, a token cryptogram, a token assurance level, and data used to generate the token assurance level. The payment token may include a payment token issuer identifier that may be a substitute for a real issuer identifier for an issuer. An authorization request message may also comprise additional data elements corresponding to "identification information" including, for example, a service code, a CVV (card verification value), a dCVV (dynamic card verification value), an expiration date, etc. An authorization request message may also comprise "transaction information," such as any information associated with a current transaction (e.g., the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to the merchant's access device (e.g., POS terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

An "issuer" can include a payment account issuer. The payment account (which may be associated with one or more payment devices) may refer to any suitable payment account including a credit card account, a checking account, a savings account, a merchant account assigned to a consumer, or a prepaid account.

A "payment network" may refer to an electronic payment system used to accept, transmit, or process transactions made by payment devices for money, goods, or services. The payment network may transfer information and funds among issuers, acquirers, merchants, and payment device users.

I. Exemplary Systems

Figure 1:
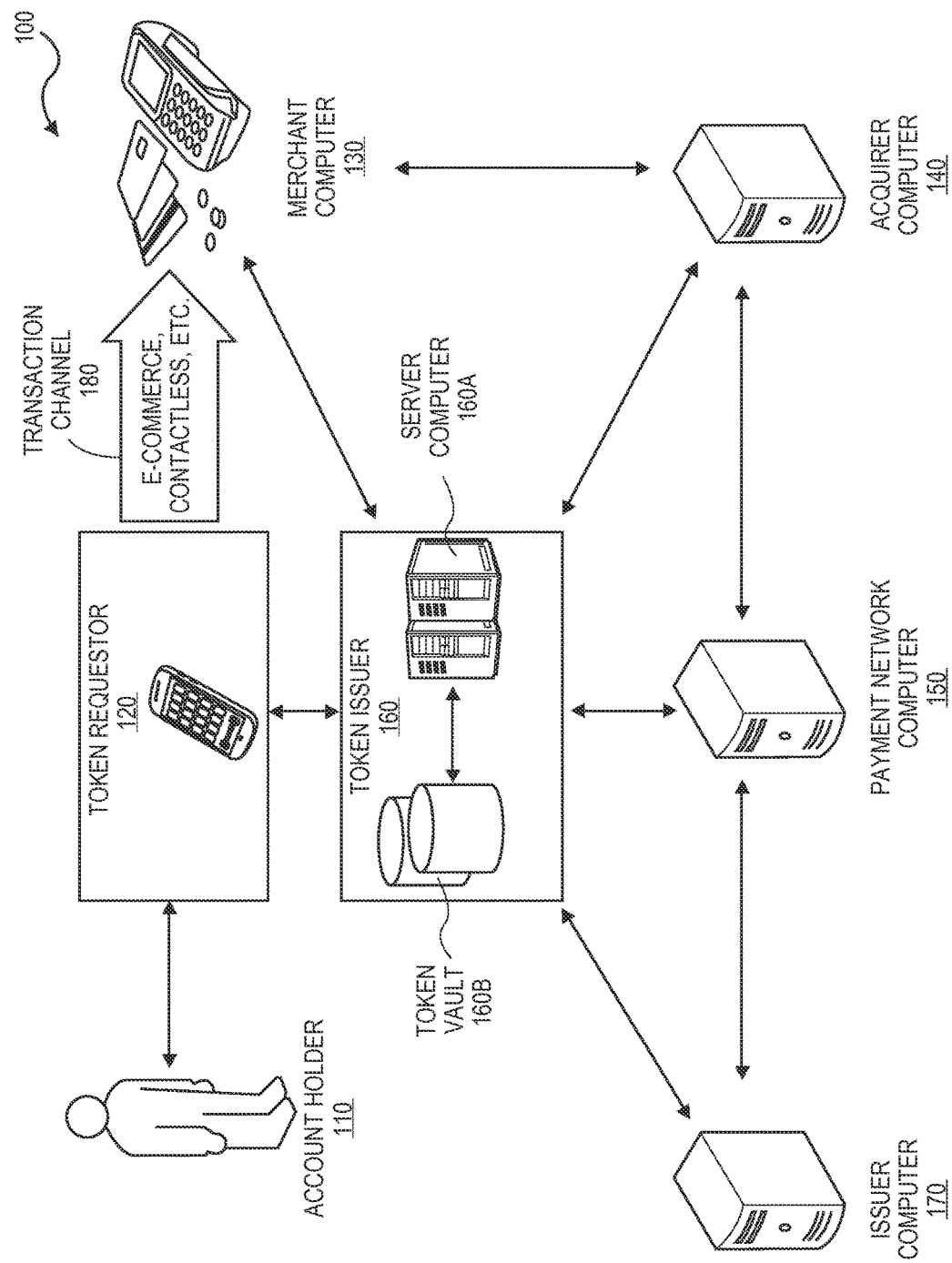
FIG. 1 is a block diagram illustrating a transaction token transaction processing system according to an embodiment of the invention.

FIG. 1 shows a block diagram illustrating a transaction processing system 100 according to an embodiment of the invention. The transaction processing system 100 may comprise an account holder 110 in communication with a token requestor 120. In this embodiment, the token requester 120 may be any suitable device suitable for carrying out a transaction associated with a merchant computer 130. The token requestor 120 may also be capable of communicating with the merchant computer or the token issuer 160. The token issuer 160 may include a token issuer server computer 160A and a token vault 160B coupled to the token issuer computer 160A. In some embodiments, the token issuer 160 may also be a token verifier. In other embodiments, the token issuer and the token verifier may be separate entities where the token issuer may generate tokens while a token verifier may be configured to validate or verify tokens issued by the token issuer.

The transaction processing system 100 may further comprise an acquirer computer 140, a payment network computer 150 and an issuer computer 170. The token requestor 120 may be configured to communicate with the merchant computer 130, the acquirer computer 140, the payment network computer 150, and the issuer computer 170 through a transaction channel 180. The transaction channel 180 may be, for example, a proximity or contactless transaction channel, an e-commerce transaction channel, a contact based transaction channel (e.g., magnetic stripe, etc.), etc.

The token issuer 160 can be configured to communicate with the merchant computer 130, acquirer computer 140, payment processing network computer 150, issuer computer 170, and the token requestor 120 over the telecommunications network or any other communications network. The various entities may be capable of communicating over any suitable network connection or communications system.

The account holder 110 can be a user of a portable consumer device (e.g., a credit card) or a consumer. The account holder 110 may utilize a communication device (e.g., a mobile phone) that can serve as the token requestor 120 during a transaction with a merchant.

The token requestor 120 may be a device or entity that may be associated with a payment account of the account holder 110. In some implementations, the token requestor 120 may be a mobile device such as a mobile phone, a tablet, a PDA, a notebook computer, a key fob, or any suitable device. The token requestor 120 may include a digital or mobile wallet and/or a payment application that may be associated with one or more payment accounts of the account holder 110. In some embodiments, the device may be configured to display a machine readable code, such as a QR code or barcode. The device may also include a camera or a scanning device capable of scanning machine readable code. Although not shown in FIG. 1, in some embodiments, a consumer may use a token requestor device to interface with a token requestor that may be provided through a remote computer (e.g., mobile wallet provider), etc. Accordingly, the consumer may use their mobile device to obtain a token that is stored by a remote server computer of a mobile wallet provider that may have previously obtained a token from a token issuer. Accordingly, there may be multiple token requestor devices in some embodiments and/or a communication device of a consumer (e.g., mobile device, laptop computer, desktop computer, etc.) that may be used to provide a previously requested token to a merchant computer or access device.

As noted above, the token requestor 120 may communicate with the merchant computer 130 via the transaction channel 180. The transaction channel 180 may be established using any suitable communication protocol. In some embodiments, the token requestor 120 may be capable of communicating with the merchant computer 130 using a contactless or proximity communication method such as NFC (near field communications) or machine readable codes such as QR codes. In some embodiments, if the merchant computer 130 is an access device such as a POS terminal, the account holder 110 may interact with the merchant computer 130 by tapping or waving the payment device near an access device associated with the merchant computer 130.

The merchant computer 130 may be associated with a merchant. The merchant computer 130 may be an access device such as a POS terminal at a merchant location, a computer coupled with an access device of a merchant, or a remote server computer that operates a web site operated by the merchant. In some embodiments, the merchant operating the merchant computer 130 may be a card-on-file (COF) merchant. The card-on-file merchant may store consumer account information in a remote database for future payments (e.g., recurring or periodic payments). The merchant computer 130 may be configured to generate an authorization request message for a transaction that is initiated by the account holder 110.

The acquirer computer 140 may be operated by an acquirer. An acquirer is typically a system for an entity (e.g., a bank) that has a business relationship with a particular merchant, a wallet provider or another entity. The acquirer computer 140 may be communicatively coupled to the merchant computer 130 and the payment processing network computer 150 and may issue and manage an account of the merchant. In some embodiments, the acquirer computer may forward the authorization request message to the payment processing network computer 150 and the authorization response message to the merchant computer 130 during a transaction to confirm processing of a payment transaction.

The payment network computer 150 may be configured to provide authorization services, and clearing and settlement services for payment transactions. A payment network computer 150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the payment network computer 150 may forward an authorization request received from the acquirer computer 140 to the issuer computer 170 via a communication channel. The payment network computer 150 may further forward an authorization response message received from the issuer computer 170 to the acquirer computer 140.

The issuer computer 170 may be operated by an account issuer. Typically the issuer is an entity (e.g., a bank) that issues and maintains an account of the account holder 110. The account may be a credit, debit, prepaid, or any other type of account.

The token issuer 160 may be a stand-alone entity or may be coupled to, integrated into, and/or operated or managed by any of the entities shown in FIG. 1. The token issuer 160 may issue tokens and may also verify the status of tokens. In such cases, the token issuer 160 may alternatively be referred to as a token verifier or token issuer. Additionally, in some embodiments, the token issuer and the token verifier may include separate entities and/or systems that may be configured to issue or generate tokens and validate or verify tokens.

According to some embodiments of the present invention, the token issuer 160 may be configured to perform a method including receiving a token request from a requestor, generating a transaction token, and providing the transaction token to the requestor. Additionally, in some embodiments, the token issuer 160 may verify transaction tokens for a requestor. The verification method may include receiving a token verification request from a token subscriber, verifying that the transaction token is valid based on at least one of the contextual data fields in the transaction token, and sending a token verification response message including a status of the transaction token to the subscriber. These methods are described in more detail below in reference to FIGS. 3, 4, and 7.

The token issuer 160 may interface with the token requestor 120 (e.g., mobile communication device) using a token requestor API interface. The token requestor API interface may provide a standard interface for the token requestor 120 to request and receive an issued transaction token, request and receive information regarding whether a transaction token is activated or deactivated, authenticate a received transaction token, and/or manage the transaction token through its lifecycle. Accordingly, a token requestor 120 may request that a token be issued by the token issuer 160, send a previously issued token (or message identifying the token) to the token issuer 160 to activate or deactivate the transaction token, send a request to the token issuer 160 to authenticate the transaction token, or provide a number of management functions regarding the lifecycle of the transaction token. In some embodiments, the token issuer 160 may communicate with an issuer or payment processing network to perform some or all of these functions.

The token issuer 160 may communicate with the merchant computer 130 through the use of merchant APIs. The token issuer 160 may exchange tokens and process or route tokens to an appropriate entity for the merchant operating the merchant computer 130. Additionally, the token issuer 160 may communicate with acquirer computer 140 through acquirer APIs. The acquirer APIs may standardize messaging between the merchant or acquirer computers 130, 140 such that the acquirer and/or merchant may exchange and route transaction tokens. The standardized API interface may also support preferred debit routing so that particular networks may be used during transaction token transaction routing.

The token issuer 160 may interface with an issuer computer 170 using issuer APIs. The token issuer 160 registers and authenticates transaction tokens for the issuer.

The token issuer computer 160 may interface with the payment network computer 150 through the use of a network or a gateway API. In some embodiments, the payment network computer 150 or a gateway API may provide message and transaction token translation between network processing systems.

FIG. 2 shows an exemplary transaction token format 200 for a transaction token for an embodiment of the invention. According to embodiments of the invention, a transaction token may be implemented by embedding a transaction token format or other information within the transaction token, or within a request or response message associated with the transaction token.

For example, the transaction token format 200 shown in FIG. 2 includes 128 bits or 8 octet pairs 210-280. The transaction token format 200 may comprise token issuer or financial institution information, as well as consumer or product information associated with the transaction token. For example, the first 64 bits (4 octet pairs 210-240) of the transaction token format 200 can identify the financial institution that issued the transaction token. The second 64 bits (4 octet pairs 250-280) can be used to represent consumer or product information. However, in other embodiments of the invention, the transaction token format 200 may include more or less data elements and data than the example shown in FIG. 2.

The exemplary transaction token shown in FIG. 2 may be "4001:f0d0:1000:0051:0000:1234:0012:0034." The information within each data field of the transaction token may represent different contextual information about the transaction token. In this example, the transaction token format 200 of the transaction token may include a payment network identifier 201, an inheritance tree data field 202, a date type identifier 203, a channel identifier 204, a purpose identifier 205, a token verifier identifier 206, channel properties identifiers 207, and a token payload 208. The number of bits mapped to each data field is not limited to any particular value and also does not need to be the same across all data fields. For example, while the example shown in FIG. 2 shows data fields mapping to one more octets, a data field within the transaction token may contain less than 8 bits in other embodiments of the invention.

A payment network identifier 201 may identify a payment network that can process the transaction token. Suitable payment networks may have centralized or distributed architectures. Exemplary payment networks may include VisaNet™, Star™, Pulse™, etc.

The inheritance tree data field 202 may identify an account issuer, token issuer, or any other entity that is associated with a contextual transaction token. For example, the inheritance tree data field may include information regarding an account issuer associated with the transaction token, a token issuer, a token requestor, a consumer device associated with the transaction token, a merchant associated with processing the transaction token, and/or any other relevant information for identifying which entities are associated with the transaction and/or transaction token. Further, the inheritance tree data field may represent any information regarding the background of the how each entity handled the token. Some examples of useful information that the inheritance tree data field may provide include who issued the token, what consumer device the token was transmitted from, the merchant who received the token, how the token was sent to the merchant, who holds the responsibility to verify the token, etc. The inheritance tree data field may be updated by each subsequent entity during transaction processing to indicate who has previously touched or processed the transaction token (e.g., a merchant may update a merchant field within the inheritance tree data field with a merchant identifier that may indicate to entities downstream the merchant that received the transaction token). The inheritance tree identifier may be designed to provide information spanning the entire transaction involving the token.

The data type identifier 203 may represent the type of token represented by the transaction token format or the purpose for the token represented by the transaction token format. For example, the data type identifier may indicate that the transaction token is associated with a primary account number (PAN), personally identifiable information (PII), or personal health information (PHI). Depending on the data type identifier, entities in the transaction processing system may alter the processing method, routing address, or may otherwise change their actions based on the type of data being represented by the transaction token.

The channel identifier 204 can identify the transaction channel(s) that can process the transaction token. For example, the channel identifier may inform a merchant as to whether the token is limited to e-commerce transactions, point of sale transactions, mobile transactions, or mobile point of sale transactions, or any combination thereof. For example, an entity (e.g., a merchant) may receive a transaction token that can only be used in a mobile wallet transaction. If the consumer tries to use the mobile wallet transaction token in an offline transaction, the transaction may not be approved and/or an alert may be initiated by the entity to notify the consumer, the issuer, or some other party that the mobile wallet transaction token was improperly used.

The purpose identifier 205 may identify the purpose of the transaction token. Examples of purpose identifiers may include a non-transactable token identifier (NTTID), a limited use token identifier (LUTID), a payment token identifier (PTID), an ecosystem specific token identifier (ESTID), and an actionable payment/transaction identifier (TTID). A NTTID purpose identifier may identify the transaction token as a non-transactable token that may be stored on a merchant system or other system instead of a real account number. This is done to ensure that the merchant system is not storing financial credentials of users and that it is PCI-DSS compliant. A LUTID purpose identifier identify the transaction token as being a limited use token. A PTID purpose identifier may identify the transaction token as being a high value token or a low value token. In some embodiments, a high value token may be one used to conduct a payment, while a low value token may be one that is not used for payment. An ESTID purpose identifier may identify a token as being associated with a particular transaction ecosystem. A transaction ecosystem may be a particular transaction environment such as a closed loop payment transaction environment defined by a merchant (e.g., a merchant card being useable only at that merchant). A TTID purpose indicator may identify a transaction token identifier that includes a transaction identifier instead of a payment account identifier. Entities may use the token purpose identifiers to determine a request associated with the received token and what actions to perform on the received token. For example, a non-transactable token identifier in a transaction token may inform an entity that the token is associated with a loyalty account or other PII information such that the system should log the token as being associated with a consumer and should not try to submit the token in a transaction, while a transactable token may be attempted to be submitted for a transaction.

A token verifier identifier 206 may identify a party that can verify the transaction token. A token verifier may receive requests from entities in the transaction ecosystem and provide a status or other indicator of the transaction token as being active, on hold, or revoked. Accordingly, entities within the transaction ecosystem may ensure that transaction tokens are active before accepting them and providing services or products.

Channel properties identifiers 207 may identify properties associated with payment or other channels associated with the transaction token. For example, the channel property identifiers may be related to geo-location information, device fingerprinting, and any other optional parameters that may be useful for informing parties of limitations and previous activities of the transaction token. For example, the channel property identifiers may provide data fields where entities may add information related to how the token was received (e.g., what channel), the type of device that received the token, whether a verification occurred during the transaction processing, optional entity specific information that the entity believes may be helpful to downstream parties, if a token has been revoked, or any other relevant information.

In one example, channel properties identifiers 207 may be added during a mobile device or mobile wallet value add transaction that may provide a transaction token based on geo-location information. For instance, when a consumer is near a gas station, a mobile wallet may determine that the consumer is near the gas station and may issue a transaction token or may automatically select a transaction token from the wallet that provides the best rewards points for the transaction being conducted. Such information could be included in the optional data fields of the channel properties identifiers.

Another example involves self-destructing payment tokens that include conditions or limitations for the transaction token that may result in the transaction token being revoked if attempted to be used outside of the conditions or limitations. Accordingly, if a transaction token is used outside an authorized geo-location, a transaction token stored in a digital wallet can be automatically revoked (or automatically self-destruct). The self-destruct condition may be initiated by including a revoked status indicator in the transaction token that informs downstream entities that the transaction token has been revoked. The system may have a user re-enroll in order to authorize a wallet, add an account, or request a token in the future. The self-destruct condition could also include providing an entry into a tokenization revocation list or other token status list that may be stored at the token verifier to de-authorize the token.

Additionally, the channel properties identifiers 207 could include an optional field that may be used if the transaction token is moved between entities where some entities may provide additional data that others do not. Accordingly, the optional field may be used to store any other data associated with the token processing, verification, etc. For example, a merchant could insert optional data so that downstream, applications or services could utilize or identify this data. For instance, a merchant may choose to include potentially useful optional data, such as the number of times a customer has completed transactions at their store or an indicator that a customer is a high value customer.

Other examples of information that may be stored in the channel properties identifiers 207 include an authentication status for the transaction. This information may be used by downstream entities to determine the level of authentication that should be completed. Additionally, fraud alert information could be included, such as an indicator when a consumer may attempt the transaction from a foreign country or a known fraudulent address. The fraud indicator could be input into the transaction token format 200 to let other downstream entities know that a fraud flag was raised. This allows downstream entities to recognize a potentially fraudulent token immediately upon receiving the token.

Additionally, the optional fields may be used to identify assurance levels or token values for a transaction. For instance, the token assurance level may include 1 through 4, where 1 indicates the transaction is self-service and the user is providing their own information on their own accord. Assurance level 2 could include, for example, a user ID and a password. These levels could continue in order to inform downstream parties of the level of authentication to be utilized. Further, the levels could be based on the criticality of usage or the transaction criticality.

A token payload 208 may also include the actual token payload or token value that is to be used in a transaction, verified, validated, or otherwise acted upon. The token value may identify the actual account number of the consumer associated with the token.

As can be seen in FIG. 2, each piece of contextual data is not constrained to any particular octet or data space. For example, the data type identifier may be positioned such that it is contained within both the first octet pair 220 and the second octet pair 230. Additionally, any identifier may contain less than an octet of data as well. Further, the contextual information could be provided in hexadecimal and interpreted by the receiving entity according to a known transaction token format. For example, if the $8^{th}$ hexadecimal digit is related to the data type for the transaction token, and the $8^{th}$ digit is a 0, the entity may know that a 0 is associated with a payment token or PAN data type. Accordingly, the system could interpret this value quickly and easily using a legend or token mapping. Further, as described above, the legend could be sent along with the transaction token or may be provided during on-boarding or other registration processes.

II. Exemplary Methods

Figure 3:
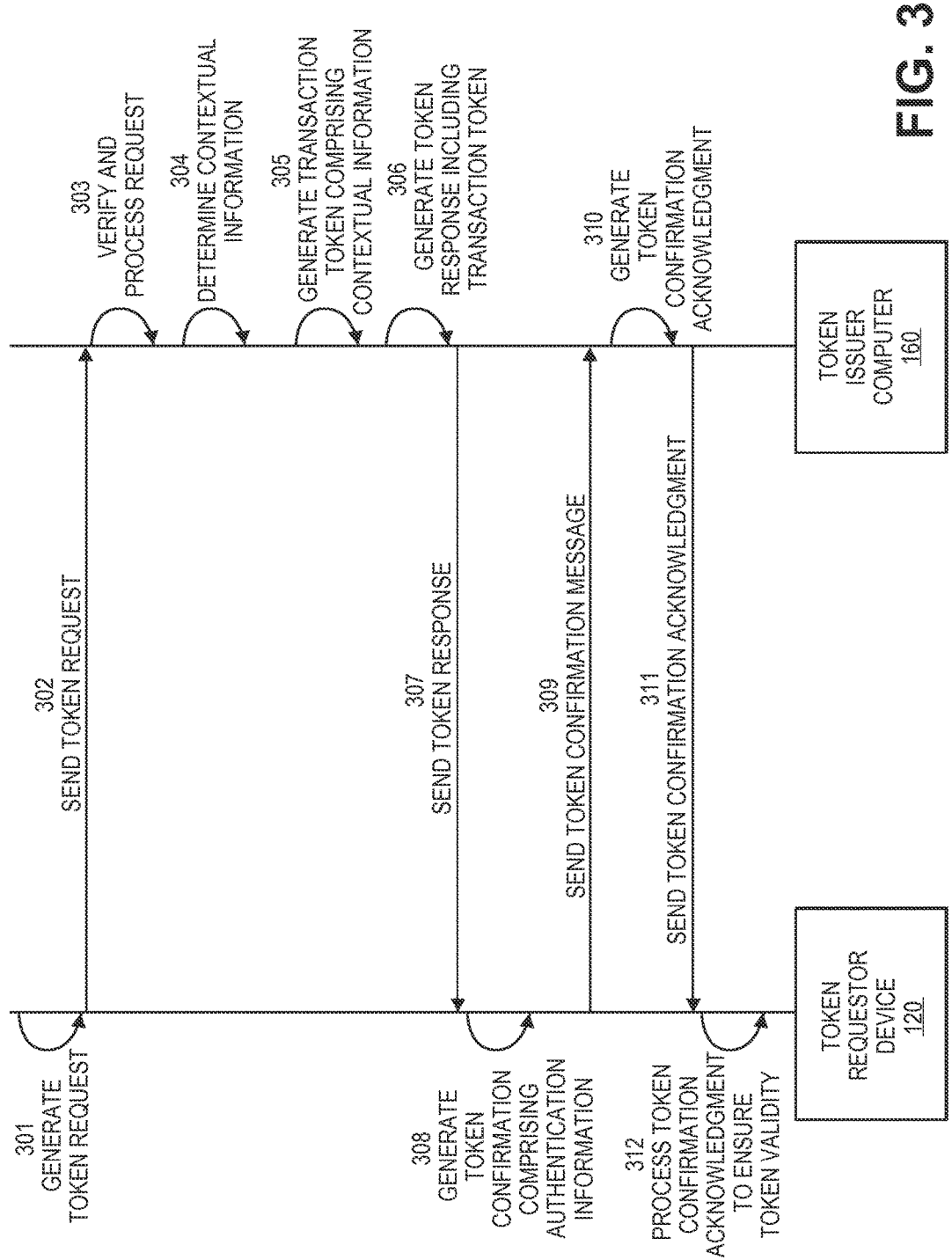
FIG. 3 shows an exemplary flow diagram for a method of requesting, generating, and delivering a transaction token between a token requestor and a token issuer according to an embodiment of the invention.

FIG. 3 shows an exemplary flow diagram for a method of requesting, generating, and delivering a transaction token between a token requestor device and a token issuer computer, according to an embodiment of the invention.

At step 301, a token requestor device 120 generates a token request message and protects the token request message using encryption (e.g., encrypting the token request using a public key provided by the token issuer), hashing, random numbers (e.g., nonce), or any other suitable methods.

In one embodiment, the token requestor device 120 may undergo an onboarding or registration process to ensure that the token requestor meets integration and security standards in order to utilize the tokenization services provided. For example, services such as card registration, token generation, token issuance, token authentication and activation, token exchange, and token life-cycle management to the registered entities may be provided.

Upon registration, the token requestor device 120 may receive a token requestor identifier to associate it with certain configuration preferences. The token requestor device 120 may specify token attributes associated with the tokens requested including, for example, token type (e.g., static or dynamic), supported token presentment modes (e.g., scan, contactless, e-commerce, etc.) and any other relevant token configuration information during the onboarding process. Further, the token requestor device 120 may include limitations to certain channels (e.g., card-on-file, contactless, etc.) for use of requested tokens. Any other limitations, conditions, use information, and/or any other token related information may be included in the token request or stored in a token requestor database that may be configured during a registration process for the token requestor.

At step 302, the token requestor device 120 may send the generated token request to the token issuer computer 160. In some embodiments, the token requestor may provide the token requestor identifier or other credentials as part of the request as a form of identification. The token request and any other communication messages described herein may be sent using any suitable communication networks and/or protocols (e.g., using HTTPS, SOAP and/or an XML interface among others).

At step 303, the token issuer computer 160 may verify and process the token request message. The token issuer computer 160 may utilize the token requestor identifier to identify the requestor and determine any token requestor configuration options or settings associated with the token requests. Further, the token issuer computer 160 may verify the token request message and the token requestor device 160 that sent it based on information provided at the registration step. If the token request message and token requestor device 120 are verified, then the token issuer computer 160 may proceed to process the token request message.

At step 304, the token issuer computer 160 may determine a consumer account and contextual information about the transaction token request. The consumer account information may be stored at the token issuer, provided by the consumer or token requestor in the token request, requested and received from an issuer associated with the account holder, and/or through any other suitable manner. Further, the consumer account information may be stored in a token vault or other secure database associated with the token issuer such that the token issuer is capable of de-tokenizing the transaction token during transaction processing.

The contextual information may comprise identification of entities involved in the transaction such as the token requestor device 120 and token issuer computer 160. The contextual information may further comprise any information surrounding or related to the transaction token and entities involved in the transaction, such as, for example, a time associated with the token request, expiration of the token, purpose of the token, transaction channel to be utilized for the token, and geo-location of the token requestor device 120. Additional potential contextual information includes any of the data fields described above in reference to FIG. 2 and any other relevant information to a transaction, token requestor, consumer, account, etc.

The token issuer may determine the contextual information through any suitable method. For instance, the token issuer may determine the contextual information by analyzing the token request, previous token requests associated with the account or consumer, token requestor settings configured during registration, the location, time, or other demographic or environmental information surrounding the token request, or any other suitable information associated with the relevant parties. For instance, a consumer may request a token through a mobile wallet that is associated with a particular merchant. Accordingly, the token may include a condition limiting the transaction tokens to use at the merchant, may be limited in geographic acceptability to a location within 100 miles of the consumer's home address, and the merchant's mobile application may only allow single use tokens so the token may be limited to a single use. Accordingly, the token issuer may determine the relevant information from the token request, settings associated with the token requestor (i.e., merchant's mobile wallet provider), and consumer information (e.g., consumer geo-location/ address).

At step 305, the token issuer computer 160 may generate a transaction token based on the determined contextual information. The token issuer may generate the transaction token using a transaction token format that may be interpreted by entities within the transaction processing system. Accordingly, the token issuer may determine a transaction token format to use for the token generation and may generate a token in line with the determined token format. For example, the transaction token format may include information identifying a token issuer, token purpose, generation or request time, expiration date or time, geo-location of the token subscriber, consumer, or token requestor, one or more usable transaction channels, any other conditions or limitations, and any other information that may be useful to entities handling the transaction token.

For example, as shown in FIG. 2, the token issuer may generate a transaction token including "4001:f0d0:1000: 0051:0000:1234:0012:0034" based on the determined contextual information that provides understandable and interpretable contextual information for any entities within the transaction processing system that have access to a corresponding token legend for the transaction token format used by the token issuer. Accordingly, the contextual information within the token format may be interpreted according to a mapping of data fields stored in a token legend. For instance, the token issuer may generate the transaction token to indicate a payment network ("40" for payment processor A), a token issuer ("01f0" for token issuer computer 160), a data type ("d01" for PAN), channel restrictions associated with an e-commerce transaction ("00" for e-commerce transaction), a token purpose ("00051" for payment token identifier), a token verifier ("0000" for same entity as token issuer), channel properties ("1234" for the zip code of the token requestor device 120), and the token payload ("0012:0034" representing a numeric token).

As explained above in reference to FIG. 2, the transaction token format may also be configured to contain an inheritance tree indicating all the entities involved with the transaction. As such, in some embodiments, a device identifier associated with the token requestor, a merchant identifier data field, and any other relevant information may be included in the transaction token. At token issuance or generation, some of these data fields may be empty (e.g., a merchant identifier may be empty until a merchant receives the transaction token) while other fields may be populated by the token issuer (e.g., token issuer identifier and/or token requestor device identifier). Accordingly, various information surrounding the token from its issuance until its present state may be immediately retrieved by any entity that receives the transaction token and has access to the corresponding token legend associated with the transaction token or token issuer.

At step 306, the token issuer computer 160 may generate a token response message including the transaction token. If the token request message or the token requestor device 120 is not verified in step 303, the token issuer computer 160 may not generate a token and instead include an indication of the failed verification result in the token response message.

At step 307, the token issuer computer 160 may send the token response back to the token requestor device 120. The token response may include the generated transaction token as well as any other relevant information to identify the token issuer, the user and/or account holder associated with the token response, and any other relevant information to the token request.

At step 308, the token requestor device 120 may receive the token response message and may handle the response by generating a token confirmation message comprising authentication information. The authentication information may include any relevant information to allow the token issuer validate the identity of the token requestor device. For example, the token confirmation message may comprise pre-designated information associated with the received token, a token requestor identifier, and any other information that allows the token issuer computer 160 to confirm that the token requestor device 120 is authentic and is the entity intended for the token. For example, the token requestor device 120 may include authentication information such as the data type of the token included in the token response, a token requestor identifier, the channel properties of the received transaction token, a token purpose that the transaction token is meant to be used for, and/or any other information that may be used to validate the identity of the token requestor and/or token requestor device. For instance, the token requestor device may indicate a portion of the PAN that the transaction token is associated with, the token requestor device 120, an identifier associated with an e-commerce transaction channel, and an indicator associated with the transaction being a payment token. Unless the token requestor had access to the token legend and/or the registration information associated with the token issuer, the token requestor could not know this authentication information and thus, providing this information authenticates the token request to the token issuer computer.

At step 309, the token requestor device 120 may send the token confirmation message to the token issuer computer 160. In some embodiments, the token requestor device 120 may provide the token requestor identifier as part of the confirmation message as a form of identification.

At step 310, the token issuer computer 160 receives the token confirmation message and processes the confirmation to ensure the data in the token confirmation message matches with and thus authenticates or verifies the token requestor device 120. For example, the token issuer computer 160 may recognize that the information within the token confirmation message indicating a transaction token associated with a PAN, the token requestor device 120, the e-commerce transaction channel, and a payment token matches the contextual information that may be determined from the transaction token. Accordingly, an additional layer of security is provided since the verification step by the token issuer computer 160 may affect how the token is routed and/or processed thereafter. For example, a misused or fraudulent token may be barred from being further processed in the transaction processing system when the token is received for processing at the token issuer, a token verifier, or a payment network. For instance, a tokenization revocation list may be updated with the token in order to revoke its use in the future.

Through this authentication step, the token issuer computer 160 may be capable of determining whether the appropriate entity received the transaction token, as well as whether the transaction token was successfully processed, unaltered, or intercepted during transmission. Hence, the token issuer computer 160 may determine whether the transaction token was suspicious or problematic for any reason during transmission. The token issuer computer 160 may then make a decision regarding the validity of the received token confirmation message (and the corresponding issued transaction token) and generate a token confirmation acknowledgement message to be sent to the token requestor device 120 including an indicator of the decision.

If the token issuer computer 160 determines that the token confirmation message is invalid, or otherwise determines that the token response may have been intercepted or the data may have been corrupted, the token issuer computer 160 may update a list of token statuses or other information contained in a token revocation list (TRL) that the token is revoked or put on hold. Accordingly, if a party attempts to use the token in a transaction, the token may be denied. More information regarding the token revocation list (TRL) and how it may be implemented may be found in U.S. application Ser. No. 14/512,321, filed on Oct. 10, 2014, which is hereby incorporated by reference in its entirety for all purposes and is assigned to the same assignee as the present application.

At step 311, the token issuer computer 160 may send the token confirmation acknowledgement, which may include an indicator of whether the usage of the token is valid, to the token requestor device 120.

At step 312, the token requestor device 120 handles and processes the token confirmation acknowledgement to ensure the token is still validated. The token requestor device 120 may check the validation status indicator sent in the token confirmation acknowledgement to ensure that the token issuer computer 160 indicates that the token is ready to be used and is still valid. Accordingly, the token requestor device 120 may possess a transaction token that may be used to initiate a transaction. The transaction token may be utilized in the transaction processing system to allow immediate understanding of contextual information surrounding the token by any entity or token subscriber within the transaction processing system.

Figure 4:
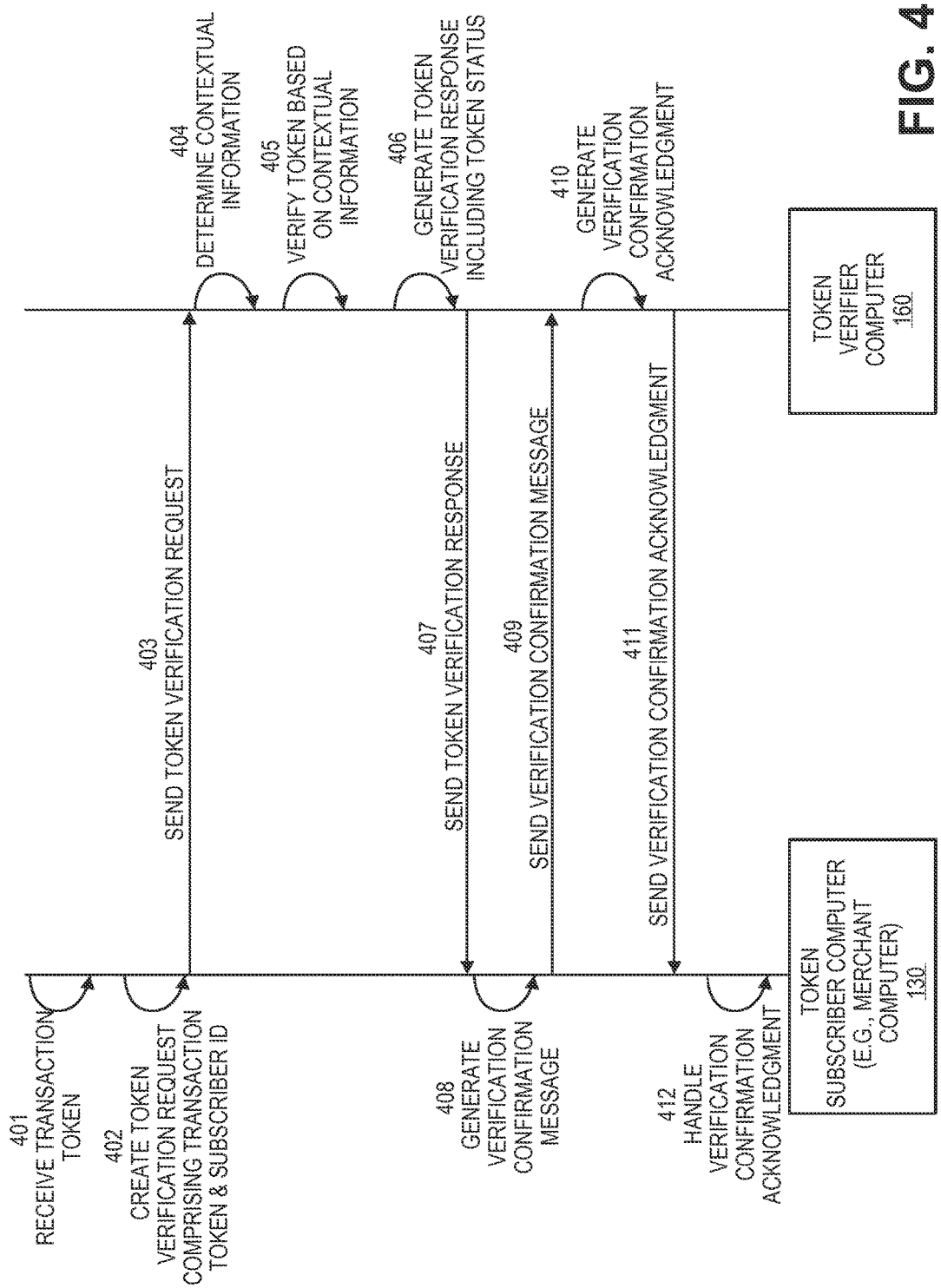
FIG. 4 shows an exemplary flow diagram for a method of verifying a transaction token between a token subscriber (e.g., a merchant computer) and a token verifier according to an embodiment of the invention.

FIG. 4 shows exemplary methods of verifying a transaction token between a token subscriber computer (e.g., merchant computer) and token verifier computer, according to an embodiment of the invention. Although FIG. 4 shows an example of a merchant computer, the token subscriber may include any entity within the transaction token processing system.

At step 401, a token subscriber computer 130 may receive a transaction token associated with a transaction token format from a token requestor device for a transaction. For example, a merchant computer may receive the token from a consumer's mobile device during an e-commerce transaction or a contactless transaction in exchange for goods or services. Once the token subscriber computer receives the transaction token, the token subscriber may determine the token legend or interpretation information associated with the transaction token. The transaction token format may comprise any contextual information that may be useful for processing, verifying, and using a token, as described above in reference to FIG. 2. The token subscriber may determine the token legend through any suitable method, for example, by the system identifier ("40") or any other relevant contextual information in the transaction token, an indication from the token requestor associated with the transaction (e.g., a flag or indicator provided by the token requestor device), or through any other suitable method.

At step 402, the token subscriber computer 130 may create a token verification request. The token verification request may comprise a transaction token, a token subscriber identifier, transaction information, and any other information that may be useful to the token verifier computer 160 to verify and/or validate the token. Although not shown in FIG. 4, in some embodiments, the token subscriber computer (e.g., merchant computer) may interpret and validate the transaction token using the transaction information in parallel, instead of, or in combination with sending a token verification request to the token verifier computer.

At step 403, the token subscriber computer 130 may send the token verification request to the token verifier computer 160. The token subscriber computer may determine the token verifier through any suitable method. For example, the token subscriber may interpret the contextual information in the transaction token to determine a token issuer and/or token verifier associated with the transaction token and obtain the communication address associated with the identified token issuer and/or verifier from a database or other configuration information. The token verifier computer 160 may verify the information included in the token verification request.

At step 404, the token verifier computer 160 may receive the verification request and may determine contextual information about the token using the relevant token legend associated with the transaction token (where the token verifier is configured to use more than one token legend). As described in step 401 above, the token verifier may determine the relevant token legend through any suitable method and may use the identified token legend to interpret the contextual information included in the transaction token.

The contextual information may comprise any information surrounding or related to the transaction token and the entities involved in the transaction associated with the token. For example, the token verifier computer 160 may determine that the transaction token is of the data type PAN, requested by the token requestor device 120, limited to the e-commerce transaction channel, and meant to be used as a payment token. Additionally, the token verifier may determine the token payload, expiration information, and any limitations associated with the transaction token.

At step 405, the token verifier computer 160 may verify the transaction token is valid based on at least one of the contextual data fields. Accordingly, the token verifier computer 160 may utilize the contextual information included in the transaction token format to determine what entities have accessed the token and how they have handled the token. For example, if the transaction token includes information that is interpreted to state that the transaction token may only be processed by a single merchant computer but the transaction token includes contextual information stating that the transaction token was used in a transaction by a different merchant, the token verifier may determine that the transaction token is no longer valid or may need to be further investigated.

Additionally, as another example, the token verifier computer 160 may obtain token purpose information from the transaction token format using the token legend and compare the token purpose information to channel information related to how the transaction token was received by the token subscriber or other entity. Accordingly, the token verifier computer 160 may compare the determined contextual information to the transaction environment that the transaction token is being processed within in order to determine the validity of the received transaction token. Furthermore, the token verifier computer 160 may ensure that all limitations and conditions associated with the original token are still intact. In some embodiments, the token verifier may also compare the limitations to the transaction information associated with the verification request.

Accordingly, the token verifier computer 160 may process the verification request and make a determination as to the status of the underlying transaction token. For example, the token verifier computer 160 may check whether the transaction token is being utilized in the e-commerce transaction channel as indicated it should be in the token verification request. If the transaction token is not being utilized in an e-commerce transaction, the token verifier computer 160 may recognize immediately that the transaction token may be fraudulent. The token verifier computer 160 may verify as many data fields associated with the transaction token as necessary and/or desired to make a decision about the validity of the token.

Additionally, in some embodiments, the token verifier computer 160 may validate the token using out-of-band processing between the intermediate entities. Accordingly, the token verifier computer 160 may access outside systems or feedback from entities within the transaction processing ecosystem so that the token verifier computer 160 may take appropriate action regarding validation of a transaction token. Accordingly, the token verifier computer 160 can make a fraud decision or other acceptance or revocation decision based on a deployed set of risk parameters or rules associated with a particular merchant or other token subscriber.

Furthermore, in some embodiments, the decision may be based on information contained in the transaction token as well as information received from third parties during transaction processing. Accordingly, the token verifier computer 160 may use the contextual information of the transaction token as well as information provided by third parties to make a decision about whether the token is valid or not. For example, the transaction token format may indicate that it is associated with a payment network ("40" for payment processor A) and another entity in the transaction processing ecosystem may maintain a database containing predefined information regarding the risk levels associated with certain payment network systems. The transaction token may query the risk level associated with the payment processor A from the database in order to help make a decision whether further usage of the token is appropriate. For instance, if the database indicates that the payment network A associated with the transaction token has a high risk level, the token verifier computer 160 may indicate such information in the token verification response message.

Further, the token subscriber (e.g., merchant) may have the ability to set fraud rules or other restrictions on tokens associated with the token verification requests associated with the token subscriber ahead of time as part of the token generation process or registration process with the token issuer and/or verifier. Thus, on receipt of the token, the token verifier computer 160 could validate the token against the set of rules particular to the merchant. For example, the merchant may have a predefined set of authentication processes and fraud rules regarding the risk levels that are appropriate for tokens to be utilized by the merchant. The fraud rules may define a high risk level and indicate that a high risk level indicates that a token should not be validated. Accordingly, the transaction token associated with the payment network "A" indicating a high risk level would not be validated based on designated fraud rule indicators or settings provided by the merchant. The token verifier computer 160 may indicate this validation decision in the token verification response message.

At step 406, the token verifier computer 160 may generate a token verification response message indicating the verification status of the transaction token. If the status of the transaction token indicates that the transaction token is not verified, the token verifier computer 160 may include an indication of the failed verification result in the token response message to be sent back to the token subscriber computer 130. In some embodiments, the verification result may be included within the transaction token such that entities within the transaction processing system may immediately determine that the transaction token has been revoked or not verified. Thus, entities may use the verification identifier in the transaction token recognize a fraudulent transaction before it is completed, increasing the security of the transaction processing system.

At step 407, the token verifier computer 160 may then send the token verification response message including a status of the transaction token to the token subscriber computer 130. The token verification response may include any information that allows the token subscriber to determine the relevant transaction token associated with the verification result. Additionally, the token verification response message may include the transaction token, and thus any other contextual information that may be obtained from the transaction token format may be retrieved upon receiving the token response message and utilized for further authentication by the token subscriber.

At step 408, the token subscriber computer 130 may receive the token verification response and may generate a verification confirmation message including an indicator informing the token verifier computer 160 that the response was received. Upon receiving the transaction token, the token subscriber computer 130 may check the status of the token received in the response message and decide whether the token is fit to be processed in its current state. For example, if the token verification response indicates that the token verifier computer 160 determined the token to be invalid due to a high risk level, the token subscriber computer 130 (e.g., merchant computer) may indicate to decline the transaction. Additionally, some token subscribers may perform additional authentication processes and/or forward the token information to customer service for additional follow up.

At step 409, the token subscriber computer 130 may send the verification confirmation message to the token verifier computer 160 to indicate that the token status has been checked and that the token subscriber successfully received the verification response. As explained in relation to FIG. 3, the confirmation message may include authentication information to allow the system to verify that the correct subscriber received the verification response. Additional details may be found in relation to step 308 of FIG. 3.

At step 410, the token verifier computer 160 may receive the confirmation message from the token subscriber computer 130 and generate a confirmation message acknowledgement indicating that the confirmation message was received. As explained in relation to FIG. 3, the confirmation acknowledgement may include any relevant information to ensure correct delivery and authentication. Additional details may be found in relation to step 310 of FIG. 3.

At step 411, the token verifier computer 160 may return the confirmation message acknowledgement to the token subscriber computer 130 indicating the acknowledgement was received. Additional details may be found in relation to step 311 of FIG. 3.

At step 412, the token subscriber computer 130 may receive the acknowledgement message and handle it to confirm that the verification process is complete. The token subscriber computer 130 may then make a decision in line with the status received from the token verifier computer 160 and internal fraud or token acceptance processes. Depending on transaction factors, the token verification response, and any other internal verification and authentication processes, the token subscriber computer 130 may decide to move forward with or decline the transaction utilizing the token.

Figure 5:
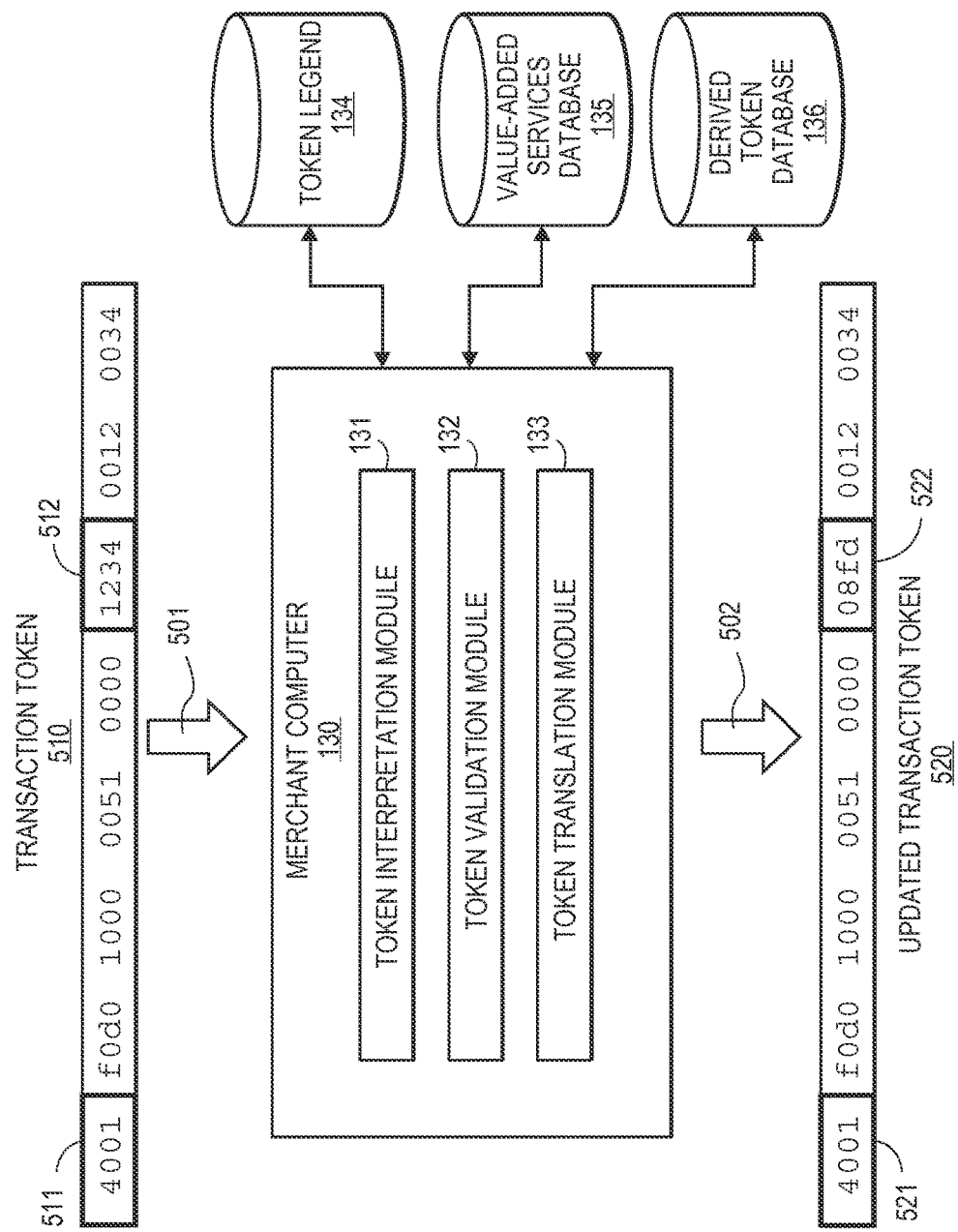
FIG. 5 shows an exemplary block diagram of a merchant computer and an exemplary flow diagram of an exemplary method for updating a transaction token, according to an embodiment of the invention.

FIG. 5 shows an exemplary block diagram of a merchant computer where the merchant computer receives a transaction token and generates an updated transaction token, according to an embodiment of the invention.

A transaction token may be updated to facilitate further token management, value added functionality, and provide additional contextual information to entities within the transaction system. In an embodiment, a merchant may generate a derived token in order to store and analyze transaction information that may be useful internally, as well as externally, such as for other entities in the transaction processing system. While FIG. 5 shows a merchant computer generating a derived token, note that any entity involved in the transaction may be capable of generating a derived token and/or updated transaction token.

A merchant computer 130 may comprise a processor communicatively coupled to a network interface, a memory, and a computer readable medium (not shown). The merchant computer 130 may further comprise modules that may be configured to handle tokens, including a token interpretation module 131, a token validation module 132, and a token translation module 133. Additionally, the merchant computer 130 may be capable of communicating with various databases including a token legend database 134, a value-added services database 135, and/or a derived token database 136 to obtain relevant information associated with a transaction token 510 and perform the functionality described herein. The merchant computer 130 may utilize the information to generate an updated transaction token 520 including updated data fields 522. The updated data field 522 may include additional contextual information or value-added services data that may be used by other entities within the transaction processing system.

The merchant computer 130 may communicate with nay entities utilizing one or more communication networks. The merchant computer 130 may comprise a network interface that may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x and/or the like. A communications network may be any one and/or the combination of the following: a direct interconnection; the Internet; a Local Area Network (LAN); a Metropolitan Area Network (MAN); an Operating Missions as Nodes on the Internet (OMNI): a secured custom connection; a Wide Area Network (WAN); a wireless network (e.g., employing protocols such as, but not limited to a Wireless Application Protocol (WAP), I-mode, and/or the like); and/or the like.

The merchant computer 130 may comprise a computer readable medium, which may be in the form of a memory (e.g., flash, ROM, etc.) and may comprise code, executable by the processor for implementing methods described herein. For example, the computer readable medium may comprise code, executable by the processor to implement a method comprising: receiving a transaction token comprising determined contextual information, interpreting the contextual information in the transaction token, verifying the transaction token is valid based on the interpreted contextual information, translating the interpreted information to update the transaction token to include merchant-specific data, and sending the transaction information including the transaction token to a payment processing network for processing.

In step 501, the merchant computer 130 may receive a transaction token 510 including contextual information about the token. The merchant computer 130 may need to obtain information surrounding the token in order to verify that the token being utilized is valid. The information in the transaction token may be interpreted by the token interpretation module 131.

The token interpretation module 131 may include any suitable software module configured to interpret the contextual information stored in a transaction token. As described herein, the contextual information may include any relevant information to any of the entities within the transaction processing system. Some non-limiting examples of the contextual information that may be deciphered includes who issued the token, what device the consumer utilized, which merchant received the token, what transaction channel was utilized (i.e. how the token was transferred to the merchant), who is responsible for verifying the token, the purpose of the token, limitations to the tokens use, and any other potentially important information. This information interpreted from the contextual information stored in the transaction token may be utilized to determine whether the token is being processed in the appropriate context. For example, the token interpretation module 131 may interpret that the token is meant to be utilized only in e-commerce transactions, despite the token being currently processed at a point-of-sale terminal. This discrepancy may indicate a misused token and prevent a token from being validated. In some embodiments, the token interpretation module may rely on information stored in token legend which may be stored in a token legend database 134, to help interpret whether the information contained within the transaction token.

For example, the token interpretation module 131 may receive the transaction token 510, which may contain a format identifier or otherwise indicate that the transaction token is associated with the token legend 134 for interpreting the contextual information within the token. The token interpretation module 131 may then obtain the identified token legend from the token legend database 134 and query the information relevant to the transaction token 510 from the token legend. The token interpretation module 131 may first determine the token format of the transaction token and parse the transaction token according to the identified format in the token legend. For example, the token interpretation module may determine that the first two digits are associated with the payment network, the next two digits are identified with a token issuer, etc. Accordingly, the token interpretation module may parse the received transaction token into relevant and understandable data fields in line with the determined token legend. Thus, the token interpretation module may parse the first two digits into a first data field (e.g., payment system identifier) and the next two digits into a second data field (e.g., token issuer identifier). The token interpretation module may then map or look-up the contextual information from the token legend according to each determined data field by comparing the information parsed from the transaction token 510.

For example, a token format identifier 511 of the transaction token 510 includes "4001," which may correspond to a payment network and token issuer associated with the transaction token. The token format mapping of the identifiers in transaction token 510 to their corresponding values may be stored in the token legend database 134 as being associated with an identifier of "4001." Accordingly, the token interpretation module of the merchant computer may determine the relevant token legend from the token legend database that is associated with the token legend associated with a payment network of 40 and token issuer 01. Any other suitable method for determining the token legend may be used as well including many fewer or more digits, information included in a message instead of the transaction token, etc. Accordingly, the token interpretation module may obtain the appropriate token format and may parse the transaction token into relevant data fields identified by the token legend. Here, for example, the first four digits of the transaction token may include a payment network identifier of 2 digits ("40") and the token issuer identifier of 2 digits ("01"). Thus, the token interpretation module may use the determined token legend to serve as a lookup table which the token interpretation module can utilize to interpret information stored within the transaction token format. The token legend 134 may indicate the payment network associated with the identifier comprising "40" corresponds to payment processor "A," and the token issuer associated with the token issuer identifier "01" corresponds to token issuer "T." Thus, the transaction token may use the token legend 134 to interpret the transaction token as being issued by token issuer T and being associated with payment network A. Thus, the merchant computer may determine contextual information about a transaction token without querying a third party token vault or other central transaction entity.

The token validation module 132 may comprise code which can be used by the processor to determine whether the received transaction token is valid. The token validation module 132 may compare the interpreted contextual information received from token interpretation module 131 and determine whether the information indicates that the token is valid. If any of the validity regulations are not met, the token validation module 132 may not validate the token. This early verification step may improve fraud management and fraud detection as an invalid token may be prevented from being further processed in the transaction. In some embodiments, an entity may comprise a predefined set of processor or fraud rules in order to validate a token. For example, the merchant associated with the merchant computer 130 may comprise a set of rules that the transaction token 510 and/or transaction information may pass in order for the token to be validated.

In some embodiments, the token validation module 132 may use the interpreted contextual information to verify the transaction token is valid for the transaction information received with the token. Additionally, the token validation module 132 may be configured to generate and send a token verification request as well as receive and process a token verification response associated with a token issuer and/or token verifier as described above in reference to FIG. 4.

In some embodiments, the token validation module 132 may check whether the interpreted contextual information follows the rules set out by the merchant, such as upholding a certain risk level. If the interpreted information associated the token indicates that the token is valid in view of the information provided by the token legend 134, the token validation module 132 may validate the token and proceed to send it to the token translation module 133. On the other hand, if the interpreted information does not fit the requirements set by the merchant-specific validation rules, the token validation module 132 may include an indicator in the transaction token format that the token could not be validated.

The token translation module 133 may comprise code which can be used by the processor to update the transaction token 510 to translate a data field 512 into a new updated data field 522 based on the contextual information interpreted by the token interpretation module 131. For example, the merchant may translate the token to include the validity status determined by the token validation module 132. This may be translated as merchant specific token data with merchant-specific formatting to be utilized internally or as public information that may be utilized by other downstream entities. Another example includes updating a transaction token to include offer identifiers (e.g., coupon, etc.) or other value-added information in a token. Additionally, as described above, a merchant may update the transaction token to indicate that the transaction token has been processed or received by the merchant. In step 502, the merchant computer 130 may then send the updated transaction token 520 containing the translated field 522 (e.g., "08fd") to another entity, such as an acquirer computer or a payment network computer to be processed.

In another embodiment, the merchant may translate a token to include information for value added services, such as reward programs or coupons. The merchant computer 130 may receive a transaction token with an identifier associated with some value added service. The merchant computer 130 may communicate with a value-added services database 135 to obtain information associated with the identifier. The token translation module may then update the transaction token to include information about the value-added services database, such as a redeem code to be processed during the transaction.

Figure 6:
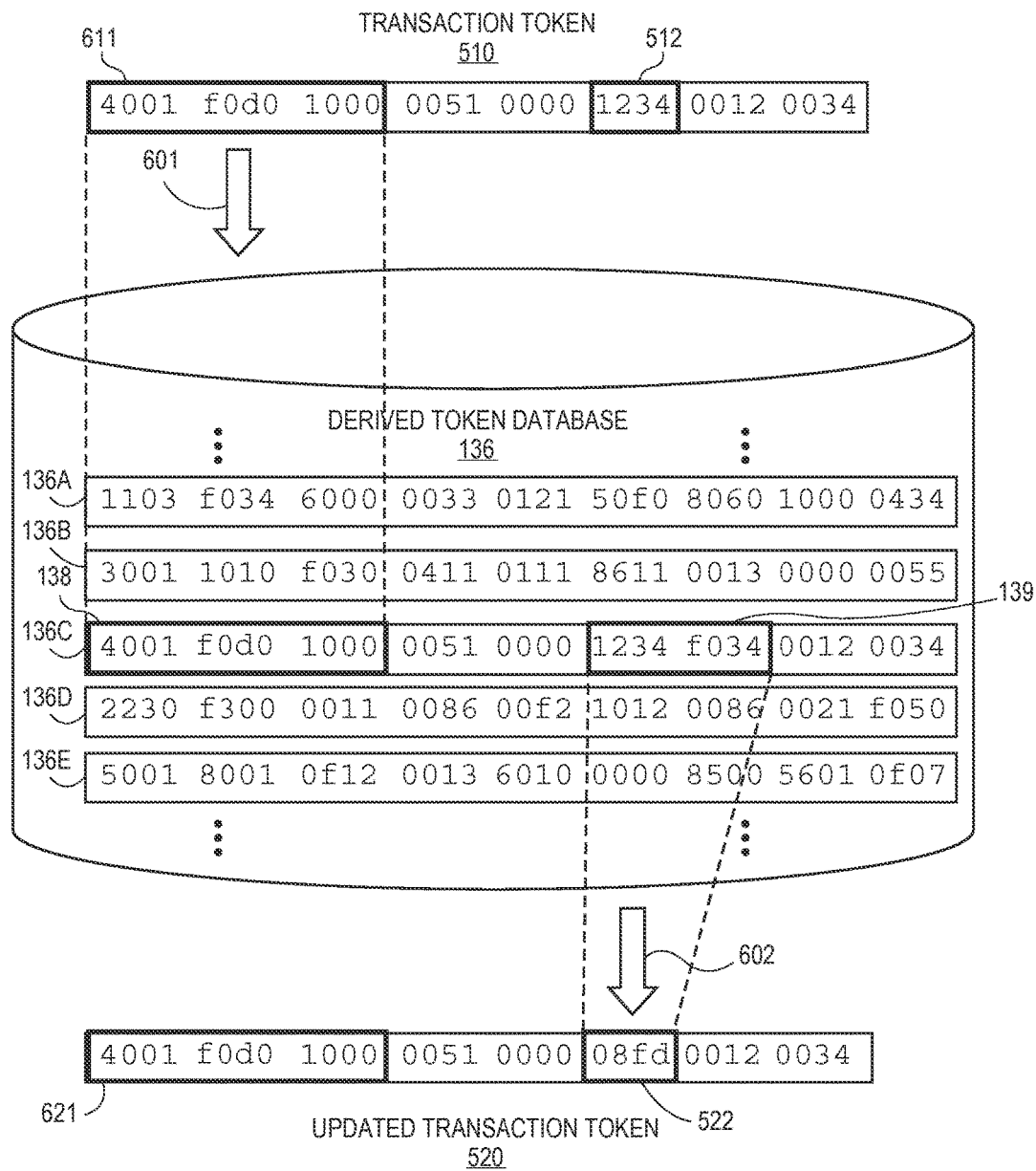
FIG. 6 shows an exemplary flow diagram of an exemplary method comprising determining a derived token associated with a transaction token from a derived token database according to one embodiment of the invention.

Further, a merchant computer 130 may communicate with the derived token database to garner additional information about a transaction token. FIG. 6 shows a schematic diagram illustrating an exemplary method comprising retrieving a derived token associated with a transaction token from a derived token database and including information translated from the derived token in an updated transaction token.

In some embodiments, the token translation module 133 may be designed to identify, process and manage consumer accounts, value-added programs, and token systems using a transaction token format. Accordingly, the transaction token allows for additional functionality to be applied to the transaction token format in order to provide entity-specific attributes. The transaction token format may expand the tokenization address to include any information that may be useful to a merchant or other entity within the transaction processing system.

As such, in some embodiments, an entity may include entity specific token data in a transaction token for internal purposes. For example, a merchant may include merchant specific token data in an updated transaction token to be utilized for internal purposes. For instance, a merchant may translate a public transaction token into a derived transaction token and hide merchant-specific information (e.g., loyalty account identifier, coupon identifier, offer identifier, etc.) in the public transaction token. Then, the merchant computer may store the derived token in a derived token database and use the derived token database to quickly and easily associate the merchant-specific information with the received transaction token. In some embodiments, the merchant-specific information may be translated and included in the updated transaction token that is transmitted to a payment network for transaction processing. In other embodiments, the merchant-specific information may only be used for internal record keeping, processing, and loyalty tracking by the merchant computer.

As shown in FIG. 6, a merchant may translate a transaction token 510 to include merchant-specific information stored in a derived token database 136, resulting in an updated transaction token 520. The merchant computer may use a transaction token identifier 511 that may be unique to the transaction token to identify a derived token that has been stored in the derived token database which can be utilized to retrieve information associated with the transaction token from the derived token database 136. For example, the derived token database may include an expanded derived token that contains more data fields than the originally received transaction token. For instance, a merchant-specific data field 512 may be added to the transaction token format to contain merchant-specific or tailored information that a merchant may desire to associate with the transaction token.

The derived token database 136 may be a database containing derived tokens associated with transaction tokens. The derived tokens may contain additional information not present in a typical transaction token comprising the transaction token format. In some embodiments, derived tokens may contain information that a merchant may want to hide and maintain internally. For example, a merchant may associate a loyalty account identifier with the transaction token and incorporate the loyalty identifier into a derived token that is stored in the derived token database. Thus, when the merchant receives a transaction token associated with the derived token, the merchant may easily determine the relationship between the received transaction token and the loyalty account.

The derived token database 136 may obtain information associated with the transaction token 510 by matching the transaction token to a derived token stored in the derived token database. Any number of digits from the transaction token may be used to determine or match a derived token stored in the derived token database. For example, in FIG. 6, a derived transaction token identifier 611 is used to match the received transaction token 510 to a derived token 136C in the derived token database 136. Depending on the number of tokens in the derived token database 136, the differences between the types of tokens received by the merchant, and any other unique information to a particular type of consumer, the derived transaction token identifier 611 may include any number of different digits in order to uniquely identify a derived token 136A-136E in the derived token database 136. For instance, if the token identifier shown in FIG. 6 includes token requestor device information that is unique to the consumer, the token requestor device information data field may be sufficient to unique identify the corresponding derived token in the derived token database 136. The derived token 136C may comprise additional data 139 that may be translated by the merchant and included in the updated transaction token 520 in an updated data field 522 that may not be present in the original transaction token.

Furthermore, in some embodiments, the transaction token format may be expanded to allow space to store additional useful information. For example, the derived token 136C stored in the token legend 134 comprises more than 16 octets of data, which may be the length of a typical transaction token, such as transaction token 510, handled by the merchant. This can increase flexibility to allow additional information to be stored in the derived token 136C, such as the additional data 139 associated with merchant specific information (e.g., value added info, coupons, loyalty information, etc.). For example, based on the format identifier 511 received from the transaction token 510, the associated additional data 139 ("f034") may identify a coupon associated with the transaction or a loyalty account associated with the transaction token. Additional possible information may include, for example, a risk level associated with the derived token or the number of transactions that have been conducted utilizing the transaction token. These are merely examples and any relevant information may be incorporated into the derived token to facilitate merchant tracking, processing, value-added services, etc.

While the above example explains one use of the derived token database 136, note that the derived token database 136 may contain other various types of information. For example, in some embodiments, the derived token database 136 may store fraud analysis or risk levels associated with utilizing a transaction token in a transaction. The derived token database 136 may be useful to store additional information that may not be directly stored in a typical transaction token handled by the merchant.

The ability for the transaction token format to include entity-specific information within its contextual information is beneficial because entity-specific information may be shared and accessed quickly and easily by the corresponding entity (and other entities if interpretation information is shared) when processing the transaction token.

Figure 7B:
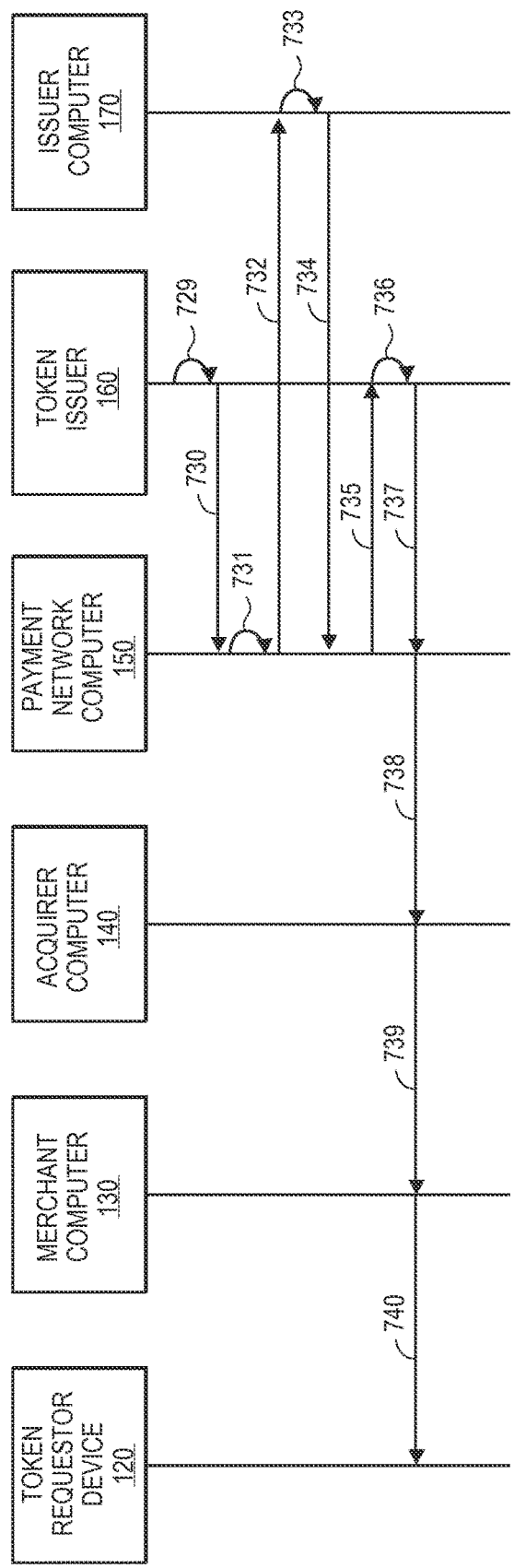

FIGS. 7A and 7B show an exemplary flow diagram for a method of processing a transaction using a transaction token, according to an embodiment of the invention. The entities involved in the transaction include a token requestor device 120, a merchant computer 130, an acquirer computer 140, a payment network computer 150, a token issuer computer 160, and an issuer computer 170. Although not shown in FIGS. 7A and 7B, in some embodiments, a token verifier computer (not shown) may be utilized to complete the token verification where the token issuer and the token verifier are separate entities. In the embodiment shown herein, the token issuer is also the token verifier so a separate token verifier computer is not shown. However, some embodiments may have separate token issuers and token verifiers.

Steps 701 through 714 may comprise a method for requesting and generating a transaction token for a transaction as described with reference to FIG. 3. For example, at step 701, a token requestor device 120 may generate a token request message to be sent to a token issuer computer 160.

At step 702, the token requestor device 120 may send the generated token request to the token issuer computer 160. The token requestor may include a token requestor identifier along with the token request in order to allow entities downstream the capability of identifying the token requestor. Additional information regarding this step may be found in relation to step 302 of FIG. 3 above.

At step 703, the token issuer computer 160 may receive the token request and process the token request message. The token request message may be verified based on contextual information associated with the token requestor device 120. Additional information regarding this step may be found in relation to step 303 of FIG. 3 above.

At step 704, the token issuer computer 160 may determine contextual information about the transaction token requested. The contextual information may be utilized to verify the token requestor, as well as the token request message. Additional information regarding this step may be found in relation to step 304 of FIG. 3 above.

At step 705, the token issuer computer 160 may generate a transaction token including the determined contextual information. The contextual information may include any information that may be helpful to the entities involved in the transaction. Additional information regarding this step may be found in relation to step 305 of FIG. 3 above.

At step 706, the token issuer computer 160 may generate a token response including the transaction token generated in step 705. Additional information regarding this step may be found in relation to step 306 of FIG. 3 above.

At step 707, the token issuer computer 160 may send the token response to the token requestor device 120. The token issuer computer 160 may include a token issuer identifier to allow downstream entities to identify the entity that issued the token. Additional information regarding this step may be found in relation to step 307 of FIG. 3 above.

At step 708, the token requestor device may generate a token confirmation message comprising any information associated with the received token or entities involved in the transaction that may allow the token issuer computer 160 to authenticate the token requestor device 120. Additional information regarding this step may be found in relation to step 308 of FIG. 3 above.

At steps 709, the token requestor device sends the token confirmation message to the token issuer computer 160. Additional information regarding this step may be found in relation to step 309 of FIG. 3 above.

At step 710, the token issuer computer 160 may generate a token confirmation acknowledgement acknowledging that the token confirmation message was received.

In step 711, the token issuer computer 160 may send the token confirmation acknowledgement back to the token requestor device 120.

At step 712, the token requestor device may process the token confirmation acknowledgement. The token validity status may be checked again at this point to ensure that the token is being utilized in the appropriate context such as correct transaction channel or geo-location. The token requestor 120 may now be in possession of a transaction token comprising contextual information in a transaction token format.

Steps 713 through 725 may comprise the method of verifying a token for a transaction as described with reference to FIG. 4. At step 713, the token requestor device 120 may send the transaction token to the merchant 130 to utilize in the transaction.

At step 714, the merchant computer 130 receives the transaction token comprising contextual information stored in the transaction token format. In some embodiments, the merchant computer 130 may conduct a validation test on the transaction token by comparing the contextual information stored in the token confirmation message against the transaction information. For example, the merchant computer 130 may ensure that the token is in good status and any limitations associated with the transaction token (e.g., transaction channel, geo-location, etc.) are not violated by the transaction. This is beneficial as the merchant computer 130 may catch fraudulent or ineligible tokens earlier in the transaction.

At step 715, the merchant computer 130 may create a token verification request comprising the transaction token, the token subscriber identifier (e.g., merchant identifier), and any other information that may help the token issuer computer 160 verify the transaction token. Additional information regarding this step may be found in relation to step 402 of FIG. 4 above.

At step 716, the merchant computer 130 may send the token verification request to the token issuer computer 160. Additional information regarding this step may be found in relation to step 403 of FIG. 4 above.

At step 717, the token issuer computer 160 may determine the contextual information included in the transaction token and token verification request. The transaction token may be verified when the token issuer computer 160 compares the determined contextual information with the environment surrounding the current transaction associated with the transaction token. For example, the transaction channel, the token requestor, time, and geo-location information may be examples of information that may utilized to verify the transaction token. Additional information regarding this step may be found in relation to step 404 of FIG. 4 above.

In step 718, the token issuer computer 160 may validate the token using the determined contextual information from step 719. Additional information regarding this step may be found in relation to step 405 of FIG. 4 above.

At step 719, the token issuer computer 160 may send the token verification response to the merchant computer 130. The token verification response may comprise the contextual information that was included in the token verification request, as well as the result of the token verification in step 720. Additional information regarding this step may be found in relation to step 406 of FIG. 4 above.

At step 720, the token verification response may be sent back to the merchant computer 130 in order to notify the merchant computer 130 about the token validity status. Additional information regarding this step may be found in relation to step 407 of FIG. 4 above.

At step 721, the merchant computer 130 may generate the verification confirmation message. The verification confirmation message may include an indicator that the merchant computer 130 acknowledged the token validity status received from the token issuer computer 160. Additional information regarding this step may be found in relation to step 408 of FIG. 4 above.

At step 722, the merchant computer 130 may send the verification confirmation message to the token issuer computer 160. At this point, if the token validity status indicates a failed status, then the transaction may be declined before any further processing may be conducted with the transaction token. Additional information regarding this step may be found in relation to step 409 of FIG. 4 above.

At step 723, the token issuer computer may generate a verification confirmation acknowledgement that the verification confirmation message was received. Additional information regarding this step may be found in relation to step 410 of FIG. 4 above.

At step 724, the token issuer computer 160 may send the verification confirmation acknowledgement to the merchant computer 130, which may handle the verification confirmation acknowledgement in step 727. Additional information regarding this step may be found in relation to step 411 of FIG. 4 above.

Steps 726 to 740 comprise the transaction utilizing the transaction token until completion. At steps 726 through 728, the validated transaction token may be sent from the merchant computer 130 to the token issuer computer 160 via the acquirer computer 140 and the payment network computer 150. At each step, any amount of potential processing may be accomplished by each entity before passing the transaction token on for processing. For example, the same amount of processing completed by the merchant computer in steps 714 and 715 could be completed by the acquirer computer and/or the payment network computer.

At step 729, the transaction token is de-tokenized by the token issuer computer 160 to provide the real account information of the account associated with the token requestor device 120 and transaction token. The account information associated with the token may be stored in a token vault (not shown), which may be accessed by the token issuer computer 160 for tokenization and de-tokenization of sensitive information. Additional verification and validation as described above may be completed at this step as well.

At step 730, the real account information determined by the token issuer computer 160 may be sent to the payment network computer 150 to allow for processing of the transaction associated with the transaction token. In some embodiments, the token issuer computer may interface directly with the account issuer computer 170 as well.

At step 731, the payment network computer 150 may process the transaction utilizing the de-tokenized account information. Processing the transaction may include various processes including determining an account issuer, performing authentication processing, and obtaining authorization from the account issuer computer 170.

At step 732, the payment network computer 150 may send the payment information, such as the de-tokenized account information and the transaction amount, to the issuer computer 170.

At step 733, the issuer computer 170 may process the information received and authorize the transaction.

At step 734, the issuer computer 170 may send the authorization status of the account information back to the payment network computer 150.

At step 735, upon receiving the response indicating that the transaction is authorized from the issuer computer 170, the payment network computer 150 may re-tokenize the account information and provide the authorization decision to the merchant and/or consumer associated with the transaction. Accordingly, the payment network computer 150 may send the account information and transaction information back to the token issuer computer 160 to be re-tokenized.

At step 736, the token issuer computer 160 may receive the account information and re-tokenize the information into a transaction token. The re-tokenization may be carried out by accessing the token vault in the token issuer computer 160 and substituting the real account information with substitute identifiers associated with the account of the token requestor device 120. Any of the steps described above regarding generating, updating, deriving, verifying, and providing tokens may be provided by the token issuer computer.

At steps 737 through 740, the transaction token and an authorization decision may be sent from the token issuer computer 160 back to the token requestor device 120 via the payment network computer 150, the acquirer computer 140, and the merchant computer 130, respectively. Accordingly, the transaction token may be returned to the transaction initiator (i.e., token requestor device) along with the authorization decision for the transaction. In some embodiments, the transaction token may be updated to include the authorization decision (e.g., approved or declined) in the transaction token such that entities may determine the authorization decision from the contextual information embedded into the transaction token.

III. Exemplary Computer System

Figure 8:
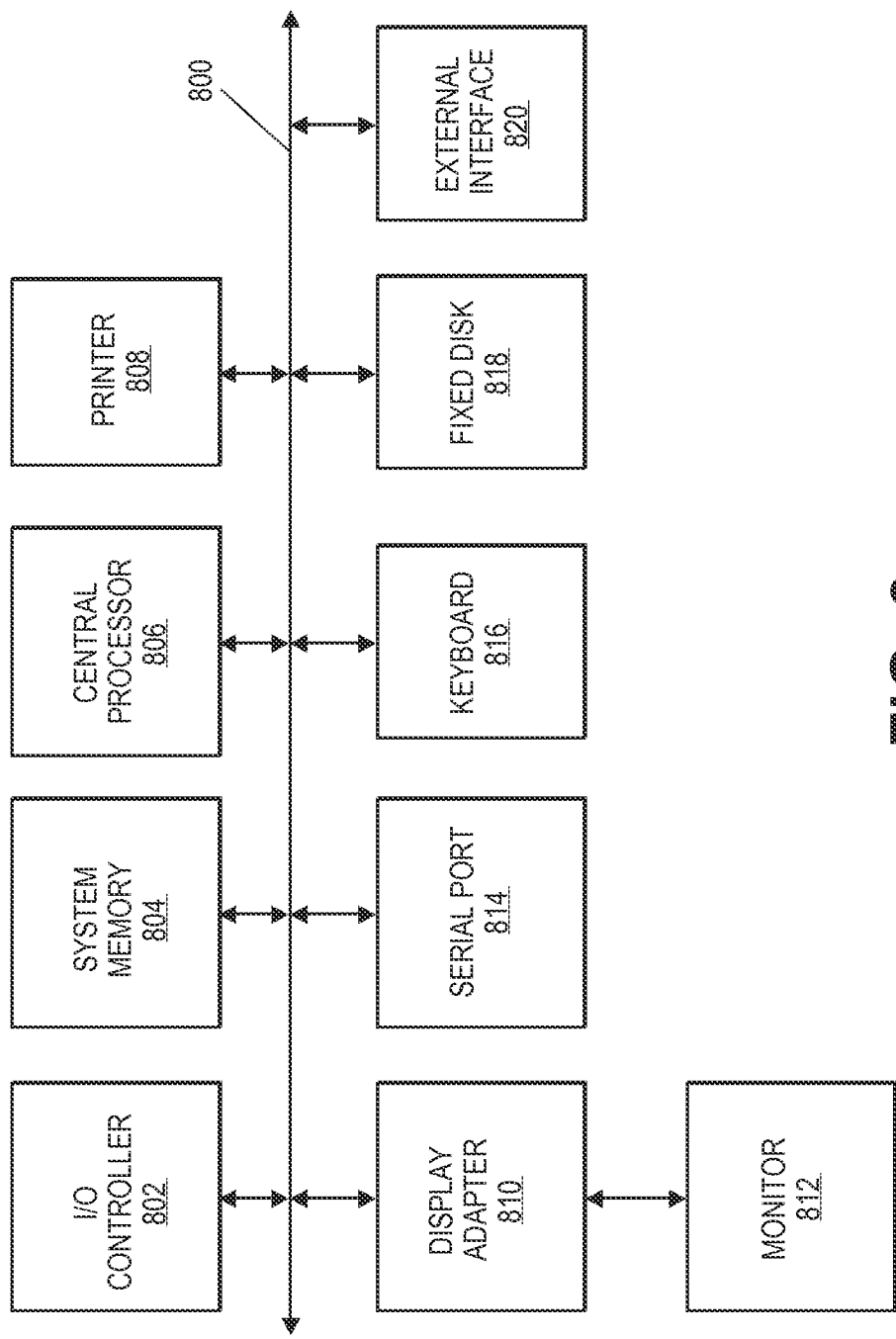
FIG. 8 is a block diagram for an exemplary computer system.

Examples of such subsystems or components are shown in FIG. 8. The subsystems shown in FIG. 8 are interconnected via a system bus 802. Additional subsystems such as a printer 804, keyboard 806, fixed disk 808 (or other memory comprising computer readable media), monitor 810, which is coupled to display adapter 812, and others are shown. Peripherals and input/output (I/O) devices, which couple to I/O controller 814 (which can be a processor or other suitable controller), can be connected to the computer system by any number of means known in the art, such as serial port 816. For example, serial port 816 or external interface 818 can be used to connect the computer apparatus to a wide area network such as the Internet, a mouse input device, or a scanner. The interconnection via system bus allows the central processor 820 to communicate with each subsystem and to control the execution of instructions from system memory 822 or the fixed disk 808, as well as the exchange of information between subsystems. The system memory 822 and/or the fixed disk 808 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, a request for a transaction token from a requestor;
   determining, by the server computer, a consumer account and contextual information associated with the request for the transaction token;
   generating, by the server computer, the transaction token as a substitute identifier for the consumer account based on a predetermined token format in response to the request by incorporating the contextual information into the transaction token, wherein the contextual information includes at least a payment network identifier and a server computer identifier identifying the server computer that generated the transaction token, the generating comprising:
      storing the payment network identifier at a first data storage field of the predetermined token format;
      storing the server computer identifier at a second data storage field of the predetermined token format; and
      leaving blank a third data storage field of the predetermined token format;
   storing, by the server computer, a mapping between the transaction token and an actual account identifier substituted by the transaction token in a transaction token database;
   sending, by the server computer, the transaction token to the requestor, wherein the transaction token is presented to a merchant during a transaction, wherein the third data storage field is populated with data by the merchant; and
   receiving, by the server computer, the transaction token in a transaction authorization request message in connection with the transaction initiated using the transaction token with the merchant;
   retrieving, by the server computer, data stored in the third data storage field;
   retrieving, by the server computer from the transaction token database, the actual account identifier for the consumer account that has been substituted by the transaction token; and
   transmitting, by the server computer, the actual account identifier of the consumer account and the data stored in the third data storage field to a payment network identified by the payment network identifier for processing the transaction using the actual account identifier and the data stored in the third data storage field.

2. The method of claim 1, wherein the transaction token is configured to be processed in the transaction initiated at an access device of the merchant.

3. The method of claim 2, wherein the merchant receives the transaction token and generates a derived token based on the contextual information of the transaction token.

4. The method of claim 3, wherein the derived token is generated by updating the contextual information of the transaction token with merchant-specific information.

5. The method of claim 2, wherein the merchant interprets the contextual information included in the transaction token, verifies the transaction token is valid for the transaction based on the contextual information, and sends transaction information including the transaction token to the server computer for processing.

6. The method of claim 1, wherein the transaction token comprises a format identifier and wherein the format identifier is associated with a predefined token legend for interpreting the contextual information included in the transaction token.

7. The method of claim 1, further comprising:
   receiving, by the server computer, a token verification request including the transaction token from a token subscriber computer;
   interpreting, by the server computer, the contextual information included in the transaction token;
   verifying, by the server computer, a status of the transaction token based on the contextual information, wherein the status of the transaction token indicates whether the transaction token is valid or invalid; and
   sending, by the server computer, a token verification response message including the status of the transaction token to the token subscriber computer.

8. The method of claim 7, wherein the token subscriber computer includes one of a merchant computer, an acquirer computer, a payment processing network computer, an issuer computer, or a fraud analysis computer.

9. The method of claim 7, further comprising:
   generating, by the server computer, a verification identifier representing the status of the transaction token; and
   modifying, by the server computer, the transaction token into a modified transaction token by storing the verification identifier at a fourth data storage field of the predetermined token format, wherein the token verification response message includes the modified transaction token.

10. The method of claim 1, wherein the contextual information includes transaction entity information and transaction parameter information.

11. The method of claim 10, wherein the transaction entity information includes at least one of an account issuer identifier, a token requestor identifier, and a token verifier identifier.

12. The method of claim 10, wherein the transaction parameter information includes at least one of a token type identifier, a channel identifier, channel properties, expiration information, and transaction restriction information.

13. The method of claim 1, wherein the data stored in the third data storage field includes a coupon.

14. A computer comprising:
   a processor; and
   a non-transitory computer-readable medium coupled to the processor, the non-transitory computer-readable medium comprising code that, when executed by the processor, causes the processor to:
   receive a request for a transaction token from a requestor;
   determine a consumer account associated with the requestor and contextual information associated with the request for the transaction token;
   generate the transaction token as a substitute identifier for the consumer account based on a predetermined token format in response to the request by incorporating the contextual information into the transaction token, wherein the contextual information includes at least a payment network identifier and a server computer identifier identifying the computer that generated the transaction token, the generating comprising:

storing the payment network identifier at a first data storage field of the predetermined token format;

storing the server computer identifier at a second data storage field of the predetermined token format; and leaving blank a third data storage field of the predetermined token format;

store a mapping between the transaction token and an actual account identifier substituted by the transaction token in a transaction token database;

send the transaction token to the requestor, wherein the transaction token is presented to a merchant during a transaction, wherein the third data storage field is populated with data by the merchant;

receive the transaction token in a transaction authorization request message in connection with the transaction initiated using the transaction token with the merchant;

retrieve data stored in the third data storage field;

retrieve, from the transaction token database, the actual account identifier for the consumer account that has been substituted by the transaction; and transmit the actual account identifier of the consumer account and the data stored in the third data storage field to a payment network identified by the payment network identifier for processing the transaction using the actual account identifier and the data stored in the third data storage field.

15. The computer of claim 14, wherein the contextual information includes contextual data fields, the contextual data fields including transaction entity information and transaction parameter information.

16. The computer of claim 15, wherein the transaction entity information includes at least one of an account issuer identifier, and a token verifier identifier.

17. The computer of claim 15, wherein the transaction parameter information includes at least one of a token type identifier, a channel identifier, channel properties, expiration information, and transaction restriction information.

18. The computer of claim 14, wherein the transaction token is configured to be processed in the transaction initiated at an access device of the merchant.

19. The computer of claim 18, wherein the merchant receives the transaction token, and wherein the merchant generates a derived token based on the contextual information of the transaction token.

20. The computer of claim 19, wherein the derived token is generated by updating the contextual information of the transaction token with merchant-specific information.

21. The computer of claim 14, wherein the transaction token comprises a format identifier associated with a token legend for determining a format of the contextual information included in the transaction token.

22. The computer of claim 14, wherein the code, when executed by the processor, further causes the processor to:

receive a token verification request including the transaction token from a token sub scriber computer;

interpret the contextual information included in the transaction token;

verify a status of the transaction token based on the contextual information, wherein the status of the transaction token indicates whether the transaction token is valid or invalid; and send a token verification response message including the status of the transaction token to the token subscriber computer.

* * * * *